(12) United States Patent
King

(10) Patent No.: US 8,719,960 B2
(45) Date of Patent: May 6, 2014

(54) TEMPERATURE-DEPENDENT NANOSCALE CONTACT POTENTIAL MEASUREMENT TECHNIQUE AND DEVICE

(75) Inventor: William P. King, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 152 days.

(21) Appl. No.: 12/865,490

(22) PCT Filed: Jan. 30, 2009

(86) PCT No.: PCT/US2009/032545
§ 371 (c)(1),
(2), (4) Date: Dec. 7, 2010

(87) PCT Pub. No.: WO2009/097487
PCT Pub. Date: Aug. 6, 2009

(65) Prior Publication Data
US 2011/0078834 A1    Mar. 31, 2011

Related U.S. Application Data

(60) Provisional application No. 61/024,962, filed on Jan. 31, 2008.

(51) Int. Cl.
*G01Q 60/38* (2010.01)

(52) U.S. Cl.
USPC ............... 850/40; 850/12; 850/13; 850/41; 850/50

(58) Field of Classification Search
USPC ........... 850/12, 13, 21, 33, 37, 38, 39, 40, 41, 850/50, 52
See application file for complete search history.

(56) References Cited

U.S. PATENT DOCUMENTS

| 2,175,696 A | 10/1939 | Lederer |
| 3,610,986 A | 10/1971 | King |
| 4,166,269 A | 8/1979 | Stephens et al. |
| 4,933,108 A | 6/1990 | Soredal |
| 5,345,815 A | 9/1994 | Albrecht et al. |
| 5,386,720 A | 2/1995 | Toda et al. |

(Continued)

FOREIGN PATENT DOCUMENTS

| WO | 94/10822 | 5/1994 |
| WO | WO 01/20283 | 3/2001 |

(Continued)

OTHER PUBLICATIONS

Asano et al. (Sep. 1992) "Field-Excited Electron Emission from Ferroelectric Ceramic in Vacuum," *Jpn. J. Appl. Phys.* 31(9B):3098-3101.

(Continued)

*Primary Examiner* — Nicole Ippolito
(74) *Attorney, Agent, or Firm* — Lathrop & Gage LLP

(57) ABSTRACT

The present invention provides a microcantilever capable of independently measuring and/or controlling the electrical potential and/or temperature of a surface with nanometer scale position resolution. The present invention also provides methods of manipulating, imaging, and/or mapping a surface or the properties of a surface with a microcantilever. The microcantilevers of the present invention are also capable of independently measuring and/or controlling the electrical potential and/or temperature of a gas or liquid. The devices and methods of the present invention are useful for applications including gas, liquid, and surface sensing, micro- and nano-fabrication, imaging and mapping of surface contours or surface properties.

38 Claims, 9 Drawing Sheets

(56) References Cited

U.S. PATENT DOCUMENTS

| | | | |
|---|---|---|---|
| 5,441,343 A | 8/1995 | Pylkki et al. | |
| 5,444,244 A | 8/1995 | Kirk et al. | |
| 5,451,371 A | 9/1995 | Zanini-Fisher et al. | |
| 5,463,277 A | 10/1995 | Kimura et al. | |
| 5,464,966 A | 11/1995 | Gaitan et al. | |
| 5,468,959 A | 11/1995 | Tahda et al. | |
| 5,583,286 A | 12/1996 | Matsuyama | |
| 5,801,070 A | 9/1998 | Zanini-Fisher et al. | |
| 5,929,438 A | 7/1999 | Suzuki et al. | |
| 5,936,237 A | 8/1999 | van der Weide | |
| 5,969,238 A | 10/1999 | Fischer | |
| RE36,488 E | 1/2000 | Elings et al. | |
| 6,050,722 A | 4/2000 | Thundat et al. | |
| 6,073,485 A | 6/2000 | Kitamura | |
| 6,079,255 A | 6/2000 | Binnig et al. | |
| 6,094,971 A | 8/2000 | Edwards et al. | |
| 6,096,559 A | 8/2000 | Thundat et al. | |
| 6,097,197 A | 8/2000 | Matsuyama et al. | |
| 6,233,206 B1 | 5/2001 | Hamann et al. | |
| 6,261,469 B1 | 7/2001 | Zakhidov et al. | |
| 6,383,823 B1 | 5/2002 | Takahashi et al. | |
| 6,436,346 B1 | 8/2002 | Doktycz et al. | |
| 6,452,170 B1 | 9/2002 | Zypman et al. | |
| 6,467,951 B1 | 10/2002 | Ghoshal | |
| 6,487,515 B1 | 11/2002 | Ghoshal | |
| 6,507,328 B1 | 1/2003 | Lee | |
| 6,535,824 B1 | 3/2003 | Mansky et al. | |
| 6,583,412 B2 | 6/2003 | Williams | |
| 6,667,467 B2 | 12/2003 | Shimizu et al. | |
| 6,668,627 B2 | 12/2003 | Lange et al. | |
| 6,762,402 B2 | 7/2004 | Choi et al. | |
| 6,763,705 B1 | 7/2004 | Thundat et al. | |
| 6,785,041 B1 | 8/2004 | Vodopyanov | |
| 6,862,923 B2 | 3/2005 | Buguin et al. | |
| 6,865,044 B1 | 3/2005 | Albrecht et al. | |
| 6,880,386 B1 | 4/2005 | Krotil et al. | |
| 6,893,884 B2 | 5/2005 | Shi et al. | |
| 6,894,272 B2 | 5/2005 | Kranz et al. | |
| 6,930,502 B2 | 8/2005 | Lee et al. | |
| 6,932,504 B2 | 8/2005 | Takahashi et al. | |
| 6,935,167 B1 | 8/2005 | Sahin et al. | |
| 6,983,644 B2 | 1/2006 | Yamanaka et al. | |
| 7,033,840 B1 | 4/2006 | Tagge et al. | |
| 7,038,996 B2 | 5/2006 | Binnig et al. | |
| 7,074,340 B2 | 7/2006 | Lugstein et al. | |
| 7,129,486 B2 | 10/2006 | Spizig et al. | |
| 7,155,964 B2 | 1/2007 | Huang et al. | |
| 7,168,298 B1 | 1/2007 | Manginell et al. | |
| 7,208,730 B2 | 4/2007 | Berstis | |
| 7,211,789 B2 | 5/2007 | Berstis | |
| 7,260,980 B2 | 8/2007 | Adams et al. | |
| 7,261,461 B2 | 8/2007 | Grudin et al. | |
| 7,268,348 B2 | 9/2007 | Binning et al. | |
| 7,281,419 B2 | 10/2007 | Wang et al. | |
| 7,291,466 B2 | 11/2007 | Su et al. | |
| 7,404,314 B2 | 7/2008 | Sahin et al. | |
| 7,451,638 B1 | 11/2008 | Sahin et al. | |
| 7,497,613 B2 | 3/2009 | King et al. | |
| 7,521,257 B2 | 4/2009 | Adams et al. | |
| 7,677,088 B2 | 3/2010 | King | |
| 7,723,909 B2 | 5/2010 | Yamaguchi et al. | |
| 7,741,615 B2 | 6/2010 | Putterman et al. | |
| 7,877,816 B2 | 1/2011 | Spizig et al. | |
| 7,928,343 B2 | 4/2011 | King et al. | |
| 8,001,830 B2 | 8/2011 | Dazzi et al. | |
| 2002/0080710 A1* | 6/2002 | Kim et al. | 369/126 |
| 2003/0081651 A1* | 5/2003 | Gianchandani et al. | 374/185 |
| 2003/0101006 A1 | 5/2003 | Mansky et al. | |
| 2004/0007680 A1 | 1/2004 | Kim et al. | |
| 2004/0020279 A1 | 2/2004 | Degertekin et al. | |
| 2004/0028119 A1* | 2/2004 | Takahashi et al. | 374/208 |
| 2004/0195096 A1 | 10/2004 | Tsamis et al. | |
| 2004/0223884 A1 | 11/2004 | Chen et al. | |
| 2004/0228258 A1 | 11/2004 | Binnig et al. | |
| 2005/0017624 A1 | 1/2005 | Novet et al. | |
| 2005/0109081 A1 | 5/2005 | Zribi et al. | |
| 2005/0127926 A1 | 6/2005 | Lee et al. | |
| 2005/0164299 A1 | 7/2005 | Stewart | |
| 2006/0012279 A1 | 1/2006 | Nanataki et al. | |
| 2006/0032289 A1 | 2/2006 | Pinnaduwage et al. | |
| 2006/0040057 A1 | 2/2006 | Sheehan et al. | |
| 2006/0150720 A1 | 7/2006 | Nakayama et al. | |
| 2006/0207317 A1 | 9/2006 | Watanabe | |
| 2006/0222047 A1 | 10/2006 | Reading | |
| 2006/0238206 A1 | 10/2006 | Eng et al. | |
| 2006/0254345 A1 | 11/2006 | King et al. | |
| 2006/0289510 A1 | 12/2006 | Atkins et al. | |
| 2007/0012094 A1 | 1/2007 | Degertekin et al. | |
| 2007/0063141 A1 | 3/2007 | Duerig et al. | |
| 2007/0103697 A1 | 5/2007 | Degertekin | |
| 2007/0107502 A1 | 5/2007 | Degertekin | |
| 2007/0109091 A1 | 5/2007 | Landsberger et al. | |
| 2007/0114401 A1 | 5/2007 | King et al. | |
| 2007/0125753 A1 | 6/2007 | Fink et al. | |
| 2007/0189920 A1 | 8/2007 | Gimzewski | |
| 2007/0190562 A1 | 8/2007 | Berstis | |
| 2007/0193347 A1* | 8/2007 | Bradshaw et al. | 73/104 |
| 2007/0286254 A1 | 12/2007 | Fon et al. | |
| 2007/0295064 A1 | 12/2007 | Degertekin et al. | |
| 2008/0093226 A1 | 4/2008 | Briman et al. | |
| 2008/0150656 A1 | 6/2008 | Hagelin et al. | |
| 2008/0283755 A1 | 11/2008 | Dazzi et al. | |
| 2008/0295583 A1 | 12/2008 | Giessibl | |
| 2008/0307865 A1 | 12/2008 | Degertekin | |
| 2009/0013770 A1 | 1/2009 | Proksche et al. | |
| 2009/0056428 A1 | 3/2009 | King et al. | |
| 2009/0139340 A1 | 6/2009 | King et al. | |
| 2009/0249521 A1 | 10/2009 | Dazzi et al. | |
| 2010/0127170 A1 | 5/2010 | Fujita et al. | |
| 2011/0030109 A1 | 2/2011 | Saito | |
| 2011/0061452 A1 | 3/2011 | King et al. | |
| 2011/0074293 A1 | 3/2011 | Hagmann | |
| 2011/0126329 A1 | 5/2011 | Despont et al. | |
| 2011/0154546 A1 | 6/2011 | Proksch et al. | |
| 2011/0167524 A1 | 7/2011 | Hu et al. | |
| 2011/0268148 A1 | 11/2011 | King et al. | |

FOREIGN PATENT DOCUMENTS

| | | |
|---|---|---|
| WO | 03/011747 | 2/2003 |
| WO | 2006/046924 | 5/2006 |
| WO | 2006/073426 | 7/2006 |
| WO | 2006/107991 | 11/2006 |
| WO | 2007/011364 | 1/2007 |
| WO | 2007/026177 | 3/2007 |
| WO | 2008/143817 | 11/2008 |
| WO | 2009/097487 | 8/2009 |
| WO | 2010/022285 | 2/2010 |

OTHER PUBLICATIONS

Auciello et al. (1995) "Low Voltage Electron Emission from Pb(Zr$_x$Ti$_{1-x}$)O$_3$-Based Thin Film Cathodes," *Appl. Phys. Lett.* 66:2183-2185.

Bhatia et al. (2011) "High-Temperature Piezoresponse Force Microscopy," *Appl. Phys. Lett.* 99:173103.

Bian et al. (2007) "Electron Emission from SrTiO$_3$-Coated Silicon-Tip Arrays," *J. Vac. Sci. Technol.* B 21:817-821.

Bian et al. (2009) "Field Emission Properties of Si Tip Arrays Coated with N-Doped SrTiO$_3$ Thin Films at Different Substrate Temperature," *J. Appl. Phys.* 105:013312.

Buguin et al. (May 7, 2001) "Active Atomic Force Microscopy Cantilevers for Imaging in Liquids," *Appl. Phys. Lett.* 78(19):2982-2984.

Byer et al. (1972) "Pyroelectric Coefficient Direct Measurement Technique and Application to a nsec Response Time Detector," *Ferroelectrics* 3:333-338.

Cahill, D.G. (1990) "Thermal Conductivity Measurement from 30 to 750K: The 3ω Method," *Rev. Sci. Instrum.* 61(2):802-808.

Chandra et al. (2007) "A Landau Primer for Ferroelectrics," In; *Physics of Ferroelectrics, Spring Topics in Applied Physics* 105:69-.

Chen et al. (May 2008) "Si Field Emitter Arrays Coated with Thin Ferroelectric Films," *Ceram. Int.* 34:971-977.

(56) References Cited

OTHER PUBLICATIONS

Choi et al. (2004) "Enhancement of Ferroelectricity in Strained $BaTiO_3$ Thin Films," *Science* 306:1005-1009.
Chu et al. (2006) "Nanoscale Domain Control in Multiferroic $BiFeO_3$ Thin Films," *Adv. Mater.* 18:2307-2311.
Chu et al. (2007) "Domain Control in Multiferroic $BiFeO_3$ Through Substrate Vicinality," *Adv. Mater.* 19:2662-2666.
Chu et al. (2008) "Electric-Field Control of Local Ferromagnetism Using a Magnetoelectric Multiferroic," *Nature Mater.* 7:478.
Chu et al. (2009) "Nanoscale Control of Domain Architectures in $BiFeO_3$ Thin Films," *Nano Lett.* 9:1726-1730.
Dames et al. (2005) "$1\omega$, $2\omega$, and $3\omega$ Methods for Measurements of Thermal Properties," *Rev. Sci. Instrum.* 76(12):124902.
Damodaran et al. (2011) "Nanoscale Structure and Mechanism for Enhanced Electromechanical Response of Highly-Strained $BiFeO_3$ Thin Films," *Adv. Mater.* 23:3170-3175.
Dunaevsky et al. (Jun. 15, 1999) "Electron/Ion Emission from the Plasma Formed on the Surface of Ferroelectrics. I. Studies of Plasma Parameters without Applying and Extracting Voltage," *J. Appl. Phys.* 85(12):8464-8473.
Enders et al. (2004) "Lorentz-Force-Induced Excitation of Cantilevers for Oscillation-Mode Scanning Probe Microscopy," *Surf. Interface Anal.* 36(2):119-123.
Gundel et al. (1989) "Copious Electron Emission from PLZT Ceramics with High Zirconium Concentration," *Ferroelectrics* 100:1-16.
Gundel et al. (1990) "Electric Field-Excited Electron Emission from PLZT-X/65/35 Ceramics," *Ferroelectrics* 110:183-192.
Gundel et al. (Jan. 1991) "Time-Dependent Electron Emission frrom Ferroelectrics by External Pulsed Electric Fields," *J. Appl. Phys.* 69(2):975-982.
Hammiche et al. (Feb. 2004) "Progress in Near-Field Photothermal Infra-Red Microscopy," *J. Microscopy* 213(2):129-134.
Higa et al. (1998) "Gated Si Field Emitter Array Prepared by Using Anodization," *J. Vac. Sci. Technol. B* 16(2):651-653.
Hii et al. (2006) "Characterizing Field Emission from Individual Carbon Nanotubes at Small Distances," *J. Vac. Sci. Technol. B* 24(3):1081-1087.
Huijben et al. (2008) "Critical Thickness and Orbital Ordering in Ultrathin $La_{0.7}Sr_{0.3}MnO_3$ Films," *Phys. Rev. B* 78:094413.
Huiling (2008) "Concentrated-Mass Cantilever Enhances Multiple Harmonics in Tapping Mode Atomic Force Microscopy," *Appl. Phys. Lett.* 92(15):151903.
Ivers et al. (1993) "Electron-Beam Diodes Using Ferroelectric Cathodes," *J. Appl. Phys.* 73(6):2667-2671.
Jensen et al. (2010) "Emittance of a Field Emission Electron Source," *J. Appl. Phys.* 107:014903.
Kang et al. (2003) "Effect of Annealing Temperature on the Electron Emission Characteristics of Silicon Tips Coated with $Ba_{0.67}Sr_{0.33}TiO_3$ Thin Film," *J. Vac. Sci. Technol. B* 21(1):453-457.
Kang et al. (May/Jun. 2001) "Electron Emission from Silicon Tips Coated with Sol-Gel $(Ba_{0.67}Sr_{0.33})TiO_3$ Ferroelelctric Thin Film," *J. Vac. Sci. Technol. B* 19(3):1073-1076.
Krasik et al. (Feb. 2003) "Ferroelectric Plasma Sources and Their Applications," *IEEE Trans. Plasma Sci.* 31(1):49-59.
Lang et al. (Aug. 2005) "Pyroelectricity: From Ancient Curiosity to Modern Imaging Tool," *Phys. Today*:31-36.
Lee et al. (1998) "Fabrication and Characterization of Silicon Field Emitter Arrays by Spin-On-Glass Etch Back," *J. Vac. Sci. Technol. B* 16(1):238-241.
Lee et al. (2007) "Microcantilever Actuation via Periodic Internal Heating," *Rev. Sci. Instrum.* 78(12):126102.
Lee et al. (Dec. 2006) "Electrical, Thermal, and Mechanical Characterization of Silicon Microcantilever Heaters," *J. Microelectromech. Syst.* 15(6):1644-1655.
Lu et al. (2007) "Field Emission of Silicon Emitter Arrays Coated with Sol-Gel $(Ba_{0.65}Sr_{0.35})_{1-x}La_xTiO_3$ Thin Films," *J. Appl. Phys.* 102:014113.
Mandelshtam et al. (1997) "Harmonic Inversion of Time Signals," *J. Chem. Phys.* 107(17):6756-6769.
Mandelshtam et al. (Sep. 8, 1998) Erratum "Harmonic Inversion of Time Signals and its Applications," [j. Chem. Phys. 107:6756(1997)] *J. Chem. Phys* 109(10):4128.
Martin et al. (2008) "Nanoscale Control of Exchange Bias with $BiFeO_3$ Thin Films," *Nano Lett.* 8(7):2050-2055.
Pabst et al. (2007) "Leakage Mechanisms in $BiFeO_3$ Thin Films," *Appl. Phys. Lett.* 90:072902.
Pantel et al. (2010) "Switching Kinetics in Epitaxial $BiFeO_3$ Thin Films," *Appl. Phys. Lett.* 107:084111.
Pintilie et al. (2009) "Orientation-Dependent Potential Barriers in Case of Epitaxial $Pt-BiFeO_3-SrRuO_3$ Capacitors," *Appl. Phys. Lett.* 94:232902.
Pogorelov et al. (2010) "Corrected Field Enhancement Factor for the Floating Sphere Model of Carbon Nanotube Emitter," *J. Appl. Phys.* 108:044502.
Riege (1994) "Electron Emission from Ferroelectrics—A Review," *Nuc. Instr. Meth. Phys. Res. A* 340:80-89.
Rosenblum et al. (1974) "Thermally Stimulated Field Emission from Pyroelectric $LiNbO_3$," *App. Phys. Lett.* 25:17-19.
Rosenman et al. (1984) "Electron Emission During the Switching of Ferroelectric Lead Germanate," *J. Exp. Theor. Phys. Lett.* 39:477-480.
Rosenmann et al. (Dec. 2000) "Electron Emission from Ferroelectrics," *J. Appl. Phys.* 88(11):6109-6161.
Rozenman et al. (Dec. 1980) "Exoelectron Emission Accompanying the Transverse Piezoelectric Effect in Lithium Niobate," *Sov. Tech. Phys. Lett.* 6(12):661-662; English translation of; *Pis'ma Zh. Tekh. Fiz.* 6, 1531 (1980).
Salmain et al. (1991) "Fourier Transform Infrared Spectroscopic Method for the Quantitative Trace Analysis of Transition-Metal Carbonyl-Labeled Bioligands," *Anal. Chem.* 63:2323-2329.
Seidel et al. (2009) "Conduction at Domain Walls in Oxide Multiferroics," *Nature Mat.* 8:229-234.
Semancik et al. (1998) "Kinetically Controlled Chemical Sensing Using Micromachined Structures," *Acc. Chem. Res.* 31:279-287.
Shannon et al. (1997) "Dual Mode Electron Emission from Ferroelectric Ceramics," *Appl. Phys. Lett.* 70:1625-1627.
Sharp et al. (1982) "Use of Low-Frequency Sinusoidal Temperature Waves to Separate Pyroelectric Currents from Nonpyroelectric Currents. Part II: Experiment," *J. Appl. Phys.* 53:8980-8987.
Shur et al. (1996) "Plasma-Assisted Electron Emission from $(Pb,La)(Zr,Ti)O_3$ Ceramic Cathodes," *J. Appl. Phys.* 79:3669-3674.
Shur et al. (1996) "Surface Discharge Plasma Induced by Spontaneous Polarization Switching," *Appl. Phys. Lett.* 70:574-576.
Shur et al. (1998) "A High-Perveance Ferroelectric Cathode with a Narrowed Electron Energy Spread," *J. Phys. D: Appl. Phys.* 31:1375-1382.
Shur et al. (1999) "Two Modes of Plasma-Assisted Electron Emission from Ferroelectric Ceramics," *J. Phys. D: Appl. Phys.* 32:L29-L33.
Sulchek et al. (May 2000) "High-Speed Atomic Force Microscopy in Liquid," *Rev. Sci. Instrum.* 71(5):2097-2099.
Vodopyanov et al. (2003) "Pulsed Mid-IR Optical Parametric Oscillators," In *Solid-State Mid-Infrared Laser Sources*; Sorokina et al. Eds. *Topics Appl. Phys.* 89:141-178.
Xiao et al. (2008) "Large Pyroelectric Effect in Undoped Epitaxial $Pb(Zr, Ti)O_3$ Thin Films on $SrTiO_3$ Substrates," *Appl. Phys. Lett.* 93:052913.
Yang et al. (2010) Above-Bandgap Voltages from Ferroelectric Photovoltaic Devices, *Nature Nanotechnol.* 5:143-147.
Yu et al. (Jul. 19, 2010) "Interface Ferromagnetism and Orbital Reconstruction in $BiFeO_3-La_{0.7}Sr_{0.3}MnO_3$ Heterostructures," *Phys. Rev. Lett.* 105:027201.
Zeches et al. (Nov. 13, 2009) "A Straindriven Morphotropic Phase Boundary in $BiFeO_3$," *Science* 326(5955):977-980.
Zhang et al. (Feb. 2011) "Large Field-Induced Strains in a Lead-Free Piezoelectric Material," *Nature Nanotechnol.* 6:98-102.
Zhao et al. (2006) "Thermal Contributions to the Bending of Bimaterial Cantilever Sensors," *Appl. Phys. Lett.* 89:033110.
Abedinov et al. (2001) "Micromachined Piezoresistive Cantilever Array With Integrated Resistive Microheater for Calorimetry and Mass Detection," *J. Vac. Sci Technol. A* 19(6):2884-2888.

(56) References Cited

OTHER PUBLICATIONS

Abel et al. (Jun. 2007) "Thermal Metrology of Silicon Microstructures Using Raman Spectroscopy," *IEEE Trans. Comp. Pack. Tech.* 30(2):200-208.

Akiyama et al. (2000) "Integrated Atomic Force Microscopy Array Probe with Metal-Oxide-Semiconductor Field Effect Transistor Stress Sensor, Thermal Bimorph Actuator, and On-Chip Complementary Metal-Oxide-Semiconductor Electronics," *J. Vac. Sci. Technol. B* 18(6):2669-2675.

Albright et al. (Apr. 1999) "'True' Temperature Measurements on Microscope Semiconductor Targets," In: SPIE Conference on Thermosense XXI, Orlando, Florida, SPIE 3700:245-250.

Allen et al. (1998) "MEMS-Based Scanning Calorimeter for Thermodynamic Properties of Nanostructures," *Microscale Thermophys. Eng.* 2:11-19.

Beckel et al. (Mar. 30, 2007) "Micro-Hotplates—A Platform for Micro-Solid Oxide Fuel Cells," *J. Power Sources* 166:143-148.

Belmonte et al. (Apr. 26, 2006) "High-Temperature Low-Power Performing Micromachined Suspended Micro-Hotplate for Gas sensing Applications," *Sens. Actuators B. Chem.* 114:826-835.

Berger et al. (Jul. 1, 1996) "Thermal Analysis Using a Micromechanical Calorimeter," *Appl. Phys. Lett.* 69(1):40-42.

Berger et al. (1998) "Micromechanical Thermogravimetry," *Chem. Phys. Lett.* 294:363-369.

Beyder et al. (2006) "Reducing Probe Dependent Drift in Atomic Force Microscope with Symmetrically Supported Torsion Levers," *Rev. Sci Instrum.* 77:056105.

Binnig et al. (1986) "Atomic Force Microscope," *Phys. Rev. Lett.* 56(9):930-933.

Binnig et al. (Mar. 1, 1999) "Ultrahigh-Density Atomic Force Microscopy Data Storage with Erase Capability," *Appl. Phys. Lett.* 74(9):1329-1331.

Biswal et al. (2006) "Nanomechanical Detection of DNA Melting on Microcantilever Surfaces," *Anal. Chem.* 78:7104-7109.

Biswal et al. (2007) "Using a Microcantilever Array for Detecting Phase Transitions and Stability of DNA," *Clin. Lab. Med.* 27:163-171.

Biswal et al. (Aug. 2006) "Using a Microcantilever Array for Detecting Phase Transitions and Stability of DNA," *J. Assoc. Lab. Auto.* 11:222-226.

Boisen et al. (2000) "Environmental Sensors Based on Micromachined Cantilevers with Integrated Read-Out," *Ultramicroscopy* 82:11-16.

Brown et al. (1999) "Cantilever-in-Cantilever Micromachined Pressure Sensors Fabricated in CMOS Technology," *Proc. 1999 IEEE Can. Conf. on Elec. and Comp. Eng.* :1686-1691.

Butt et al. (1995) "Calculation of Thermal Noise in Atomic Force Microscopy," *Nanotechnology* 6(1):1-7.

Cavicchi et all. (Jan. 1, 2004) "Micro-Differential Scanning Calorimeter for Combustible Gas Sensing," *Sens. Actuators B. Chem.* 97:22-30.

Chen et al. (Aug. 1994) "Resonance Response of Scanning Force Microscopy Cantilevers," *Rev. Sci. Instrum.* 65(8):2532-2537.

Chui et al. (Mar. 1998) "Low-Stiffness Silicon Cantilevers with Integrated Heaters and Piezoresistive Sensors for High-Density AFM Thermomechanical Data Storage," *J. Microelectrmech. Syst.* 7(1):69-78.

Chui et al. (2007) "Advanced Temperature Compensation for Piezoresistive Sensors Based on Crystallographic Orientation," *Rev. Sci. Instrum.* 78:043706.

Chui et al. (1996) "Low Stiffness Silicon Cantilevers for Thermal Writing and Peizoresistive Readback with Atomic Force Microscope," *Appl. Phys. Lett.* 69:2767-2769.

Chui et al. (1999) "Intrinsic Carrier Thermal Runaway in Silicon Microcantilevers," *Microscale Thermophys. Eng.* 3:217-228.

Datskos (1996) "Remote Infrared Radiation Detection Using Piezoresistive Microcantilevers," *Appl. Phys. Lett.* 69: 2986-2988.

Dazzi et al. (2007) "Analysis of Nano-Chemical Mapping Performed by an AFM-Based ("AFMIR") Acousto-Optic Technique," *Ultramicroscopy* 107(12):1194-1200.

Dazzi et al. (2005) "Local Infrared Microspectroscopy with Subwavelength Spatial Resolution with an Atomic Force Microscope Tip used as a Photothermal Sensor," *Optics Lett.* 30(18):2388-2390.

Dazzi et al. (2006) "Subwavelength Infrared Spectromicroscopy using an AFM as a Local Absorption Sensor," *Infrared Phys. Technol.* 49:113-121.

Dazzi et al. (2004) "Theoretical Study of an Absorbing Sample in Infrared Near-Field Spectromicroscopy," *Optics Comm.* 235:351-360.

Dazzi (2008) "Sub-100nm Infrared Spectroscopy and Imaging based on a near-field photo-thermal technique ("PTIR")," in Biomedical vibrational spectroscopy, J. Wiley ed., 291.

Degamber et al. (Sep. 2004) "Simultaneous DSC/FTIRS/TMA," *Meas. Sci. Technol.* 15:L5-L10.

Denlinger et al. (Apr. 1994) "Thin-Film Microcalorimeter for Heat-Capacity Measurements from 1.5K to 800K," *Rev. Sci. Instrum.* 65:946-958.

Despont et al. (2000) "VLSI-NEMS Chip for Parallel AFM Data Storage," *Sens. Actuators A* 80:100-107.

Dreschler et al. (2003) "Cantilevers with Nano-Heaters for Thermomechanical Storage Application," *Microelectr. Eng.* 67/68:397-404.

Dücsö et al. (May 1997) "Porous Silicon Bulk Micromachining for Thermally Isolated Membrane Formation," *Sens. Actuators A Phys.* 60:235-239.

Efremov et al. (Feb. 26, 2002) "Thin-Film Differential Scanning Calorimetry: A New Probe for Assignment of the Glass Transition of Ultrathin Polymer Films," *Macromolecules* 35:1481-1483.

Efremov et al. (Aug. 22, 2003) "Glass Transition in Ultrathin Polymer Films: Calorimetric Study," *Phys. Rev. Lett.* 91:085703.

Efremov et al. (Jun. 26, 2003) "Glass Transition of Thin Films of Poly(2-Vinyl Pyridine) and Poly(Methyls Methacrylate): Nanocalorimetry Measurements," *Thermochim Acta* 403:37-41.

Efrimov et al. (Jun. 15, 2004) "Probing Glass Transition of Ultrathin Polymer Films at a Time Scale of Seconds Using Fast Differential Scanning Calorimetry," *Macromolecules* 37:4607-4616.

Efremov et al. (2004) "Ultrasensitive, Fast, Thin-Film Differential Scanning Calorimeter," *Rev. Sci Instrom.* 75:179-191.

Felts et al. (2009) "Mechanical Design for Tailoring Resonance Harmonics of an Atomic Force Microscope Cantilever During Tip-Surface Contact," *J. Micromech. Microeng.* 19: 115008.

Fernando et al. (2007) "Improved Cantilever Profiles for Sensor Elements," *J. Phys. D-Appl. Phys.* 40(24):7652-7655.

Frisbie et al. (1994) "Functional Group Imaging by Chemical Force Microscopy," *Science* 265:2071.

Fritz et al. (2000) "Translating Biomolecular Recognition into Nanomechanics," *Science* 288:316-318.

Fung et al. (Jun. 1996) "Thermal Analysis and Design of a Micro-Hotplate for Integrated Gas-Sensor Applications," *Sens. Actuators A Phys.* 54:482-487.

Füries et al. (Apr. 30, 2002) "Thermal Investigation of Micro-Filament Heaters," *Sens. Actuators A. Phys.* 99:98-103.

Füries et al. (2004) "Thermal Characterization of Micro-Hotplates Used in Sensor Structures," *Superlattices Microstruct.* 35:455-464.

Füjries et al. (Jul. 2002) "Materials and Processing for Realization of Micro-Hotplates Operated at Elevated Temperature," *J. Micromech. Microeng.* 12:425-429.

Gimzewski et al. (1994) "Observation of a Chemical Reaction Using a Micromechanical Sensor," *Chem. Phys. Lett.* 217:589-594.

Goericke et al. (2007) "Microcantilever Hotplates with Temperature-Compensated Peizoresistive Strain Sensors," *Sens. Actuators A* 143(2):181-190.

Gotsmann et al. (2005) "Experimental Observation of Attractive and Repulsive Thermal Forces on Microcantilevers," *Appl. Phys Lett.* 87:194102.

Gotsmann et al. (2004) "Thermally Activated Nanowear Models of a Polymer Surface Induced by a Heated Tip," *Langmuir* 20:1495-1500.

Graf et al. (Jan. 2005) "3D Nonlinear Modeling of Microhotplates in CMOS Technology for Use as Metal-Oxide-Based Gas Sensors," *J. Micromech. Microeng.* 15:190-200.

Gruverman (1996) "Scanning Force Microscopy for the Study of Domain Structure in Ferroelectric Thin Films," *J Vac. Sci. Technol. B: Microelectron. Nanometer Struct.* 14(2):602-605.

(56) References Cited

OTHER PUBLICATIONS

Guo et al. (Jan. 2007) "A Monolithic Integrated 4×4 Tin Oxide Gas Sensor Array with On-Chip Multiplexing and Differential Readout Circuits," *Solid-State Electron.* 51:69-76.

Hagleitner et al. (Nov. 15, 2001) "Smart Single-Chip Gas Sensor Microsystem," *Nature* 414:293-296.

Han et al. (May 17, 2005) "Size Effect on Heat Transfer in Micro Gas Sensors," *Sens. Actuators A Phys* 120:397-402.

Han et al. (2005) "A Novel Temperature-Compensating Structure for Micromechanical Bridge Resonator," *J. Micromech. Microeng.* 15:702-705.

Hey et al. (1997) "A Combined Differential Scanning Calorimeter Optical Video Microscope for Crystallization Studies," *J. Therm. Anal.* 49:991-998.

Hodges (2001) "Improved Atomic Force Microscope Cantilever Performance by Ion Beam Modification," *Rev. Sci. Instrum.* 72(10):3880-3883.

Holbery et al. (2000) "Experimental Determination of Scanning Probe Microscope Cantilever Spring Constants Utilizing a Nanoindentation Apparatus," *Rev. Sci. Instrum.* 71(10):3769-3776.

Hotovy et al. (Apr. 2008) "Gallium Arsenide Suspended Microheater for MEMS Sensor Arrays," *Microsyst. Tech.* 14:629-635.

Hsu et al. (2004) "Cubic AgPbmSbTe2+m: Bulk Thermoelectric Materials with High Figure of Merit," *Science* 303:818-821.

Hu et al. (2008) "Investigation of the Natural Convection Boundary Condition in Microfabricated Structures," *Int. J. Therm. Sci.* 47:820-824.

Hull (1999) "Electrical Properties," and "Implantation/ Irradiation of Silicon," In; *Properties of Crystalline Silicon*, Ch. 8 and 14, INSPEC, London pp. 411-475 and 731-773.

Hutter et al. (1993) "Calibration of Atomic-Force Microsope Tips," *Rev. Sci. Instrum.* 64:1869-1873.

International Search Report and Written Opinion, Corresponding to International Application No. PCT/US09/32545, Mailed Apr. 9, 2009.

International Search Report and Written Opinion, Corresponding to International Application No. PCT/US09/54539, Mailed Dec. 23, 2009.

Jensenius et al. (May 1, 2000) "A Microcantilever-Based Alcohol Vapor Sensor-Application and Response Model," *Appl. Phys. Lett.* 76(18):2615-2617.

Johnson et al. (Jan. 17, 1992) "Applications of Simultaneous Dsc Ftir Analysis," *Thermochim. Acta* 195:5-20.

Kim et al. (2007) "Nanotopographical Imaging Using a Heated Atomic Force Microscope Cantilever Probe," *Sens. Actuators A* 136:95-103.

Kim et al. (Jun. 2009) "Thermal Conduction Between a Heated Microcantilever and a Surrounding Air Environment," *Appl. Therm. Eng.* 29(8-9):1631-1641.

King et al. (Dec. 2002) "Design of Atomic Force Microscope Cantilevers for Combined Thermomechanical Writing and Thermal Reading in Array Operation," *J. Microelectromech. Syst.* 11(6):765-774.

King et al. (2006) "Nanoscale Thermal Analysis of an Energetic Material," *Nano Lett.* 6(9):2145-2149.

King et al. (Feb. 26, 2001) "Atomic Force Microscope Cantilevers for Combined Thermomechanical Data Writing and Reading," *Appl. Phys. Lett.* 78:1300-1302.

Krebs et al. (1993) "A Low-Power Integrated Catalytic Gas Sensor," *Sens. Actuators B* 13/14:1155-1158.

Laconte et al. (Oct. 2004) "SOI CMOS Compatible Low-Power Microheater Optimization for the Fabrication of Smart Gas Sensors," *IEEE Sens. J.* 4(5):670-680.

Lai et al. (Aug. 28, 1995) "High-Speed ($10^{4\circ}$ C./s) Scanning Microcalorimetry with Monolayer Sensitivity (J/m2)," *Appl. Phys. Lett.* 67:1229-1231.

Lai et al. (Jul. 1, 1996) "Size-Dependent Melting Properties of Small Tin Particles: Nanocalorimetric Measurements," *Phys. Rev. LEtt.* 77:99-102.

Lai et al. (Mar. 2, 1998) "Melting Point Depression of Al Clusters Generated During the Early Stages of Film Growth: Nanocalorimetry Measurements," *Appl. Phys. Lett.* 72:1098-1100.

Lee et al. (2003) "Classifying Combustible Gases Using Microgas Sensor Array," *Sens. Actuators B* 93:1-6.

Lee et al. (2007) "Characterization of Liquid and Gaseous Micro- and Nanojets using Microcantilever Sensors," *Sens. Actuators A* 134:128-139.

Lee et al. (2007) "Microcantilever Hotplates: Design, Fabrication, and Characterization," *Sens. Actuators A* 136:291-298.

Lee et al. (May 2007) "Fabrication, Characterization and Application of Multifunctional Microcantilever Heaters," Ph.D. Dissertation, Georgia Institute of Technology.

Lee et al. (2008) "Microthermogravimetry Using a Microcantilever Hot Plate with Integrated Temperature-Compensated Piezoresistive Strain Sensors," *Rev. Sci Instrum.* 79:054901.

Lee et al. (2008) "Phase Change and Cooling Characteristics of Microjets Measured using Microcantilever Heaters," *Sens. Actuators A* 147:64-69.

Lee et al. (2007) "Thermal Conduction from Microcantilever Heaters in Partial Vacuum," *J. Appl. Phys.* 101:14906.

Lee et al. (2008) "Liquid Operation of Silicon Microcantilever Heaters," *IEEE Sens. J.* 8:1805-1806.

Lee et al. (Mar. 15, 2002) "A Microsensor array with Porous Tin Oxide Thin Films and Microhotplate Dangled by Wires in Air," *Sens. Actuators B Chem.* 83:250-255.

Lee et al. (Dec. 2008) "Differential Scanning Calorimeter Based on Suspended Membrane Single Crystal Silicon Microhotplate," *J. Microelectromechanical Syst.* 17(6):1513-1525.

Li et al. (2008) "Concentrated-Mass Cantilever Enhances Multiple Harmonics in Tapping-Mode Atomic Force Microscopy," *Appl. Phys. Lett.* 92(15):151903.

Lutwyche et al. (1999) "5×5 2D AFM Cantilever Arrays a First Step Towards a Terabit Storage Device," *Sens. Actuators A* 73:89-94.

Lyeo et al. (2004) "Profiling the Thermoelectric Power of Semiconductor Junctions with Nanometer Resolution," *Science*, 203:816-818.

Maali et al. (2006) "Reduction of the Cantilever Hydrodynamic Damping Near a Surface by Ion-Beam Milling," *J Appl. Phys.* 99(2):024908.

Madou (1997) "Wet Bulk Micromachining," and "Microfabrication Applications," In *Fundamentals of Microfabrication*, Ch. 4 and 10, CRC Press, Boca Raton, Florida, pp. 145-215 and 449-514.

Mamin, H.J. (1996) "Thermal Writing Using a Heated Atomic Force Microscope Tip," *Appl. Phys. Lett.* 69:433-435.

Marie et al. (2002) "Adsorption Kinetics and Mechanical Properties of Thiol-Modified DNA-oligos on Gold Investigated by Microcantilever Sensors," *Ultramicroscopy* 91:29-36.

Meier et al. (Aug. 2005) "Chemical Warfare Agent Detection Using MEMS-Compatible Microsensor Arrays," *IEEE Sens. J.* 5:712-725.

Melamud (2007) "Temperature-compensated high-stability silicon resonators," *Appl. Phys. Lett.* 90:244107.

Najafi et al. (Oct. 1994) "A Micromachined Ultra-Thin-Film Gas Detector," *IEEE Trans. Electron. Dev.* 41:1770-1777.

Nelson et al. (2006) "Direct Deposition of Continuous Metal Nanostructures by Thermal Dip-Pen Nanolithography," *Appl. Phys. Lett.* 88:033104.

Nelson et al. (2007) "Measuring Material Softening with Nanoscale Spatial Resolution Using Heated Silicon Probes," *Rev. Sci. Instrum.* 78:023702.

Nelson et al. (2007) "Temperature Calibration of Heated Silicon Atomic Force Microscope Cantilevers," *Sens. Actuators A* 140:51-59.

Nelson, B.A. (May 2007) "Nanoscale Thermal Processing Using a Heated Atomic Force Microscope Tip," Ph.D. Dissertation, Georgia Institute of Technology.

Oden (1996) "Uncooled Thermal Imaging Using a Piezoresistive Microcantilever," *Appl. Phys. Lett.* 69(21):3277-3279.

Olson et al. (2003) "The Design and Operation of a MEMS Differential Scanning Nanocalorimeter for High-Speed Heat Capacity Measurements of Ultrathin Films," *J. Microelectromech. Syst.* 12:355-364.

(56) References Cited

OTHER PUBLICATIONS

Olson et al. (Feb. 1, 2005) "Size-Dependent Melting of Bi Nanoparticles," *J. Appl. Phys.* 97:034304.
Pagonis et al. (2004) "Fabrication and Testing of an Integrated Thermal Flow Sensor Employing Thermal Isolation by a Porous Silicon Membrane Over an Air Cavity," *J. Micromech. Microeng.* 14:793-797.
Park et al. (Apr. 2007) "Frequency-Dependent Electrical and Thermal Response of Heated Atomic Force Microscope Cantilevers," *J. Microelectromech. Syst.* 16(2):213-222.
Park et al. (2007) "Topography Imaging with a Heated Atomic Force Microscope Cantilever in Tapping Mode," *Rev. Sci. Instrum.* 78:043709.
Park et al. (2008) "Routine Femtogram-Level Chemical Analyses Using Vibrational Spectroscopy and Self-Cleaning Scanning Probe Microscopy Tips," *Anal. Chem.* 80:3221-3228.
Park et al. (2007) "Low Temperature Characterization of Heated Microcantilevers," *J. Appl. Phys.* 101:094504.
Pedrak et al. (2003) "Micromachined Atomic Force Microscopy Sensor with Integrated Piezoresistive Sensor and Thermal Bimorph Actuator for High-Speed Tapping-Mode Atomic Force Microscopy Phase-Imaging in Higher Eigenmodes," *J. Vac. Sci. Technot B* 21(6):3102-3107.
Pinnaduwage et al. (Oct. 2, 2003) "A Microsensor for Trinitoluene Vapour," *Nature* 425:474.
Pinnaduwage et al. (Nov. 2004) "A Sensitive, Handheld Vapor Sensor Based on Microcantilevers," *Rev. Sci. Instrum.* 75(11):4554-4557.
Privorotskaya et al. (2009) "Silicon Microcantilever Hotplates with High Temperature Uniformity," *Sens. Act. A* 152:160-167.
Rabe et al. (1996) "Vibrations of Free and Surface-Coupled Atomic Force Microscope Cantilevers: Theory and Experiment," *Rev. Sci. Instrum.* 67(9):3281-3293.
Rabe et al. (2000) "Quantitative Determination of Contact Stiffness Using Atomic Force Acoustic Microscopy," *Ultrasonics* 38(1-8):430-437.
Rasmussen et al. (2003) "Optimized Cantilever Biosensor with Piezoresistive Read-Out," *Ultramicroscopy* 97:371-376.
Ravi (Nov. Dec. 1991) "Oxidation Sharpening of Silicon Tips," *J. Vac. Sci. Technot B.* 9:2733-2737.
Reggiani et al. (2002) "Electron and Hole Mobility in Silicon at Large Operating Temperatures—Part I: Bulk Mobility," *IEEE Trans Electron Dev.* 49:490-499.
Remmert et al. (Oct. 2007) "Contact Potential Measurement Using a Heated Atomic Force Microscope Tip," *Appl. Phys. Lett.* 91(14):143111.
Remmert. (May 2007) "Nano Thermal and Contact Potential Analysis with Heated Probe Tips," M.S. Dissertation, Georgia Institute of Technology.
Rinaldi et al. (2008) "Frequency Tuning AFM Optical Levers Using a Slot," *Microsyst. Technol.* 14(3):361-369.
Rinaldi et al. (2007) "Tuning the Dynamic Behavior of Cantilever MEMS Based Sensors and Actuators," *Sens. Rev.* 27(2):142-150.
Roylance et al. (Dec. 1979) "A Batch-Fabricated Silicon Accelerometer," *IEEE Trans. Elec. Dev.* 26(12):1911-1917.
Sadewasser et al. (2006) "Modified Atomic Force Microscopy Cantilever Design to Facilitate Access of Higher Modes of Oscilllation," *Rev. Sci Instrum.* 77:073703.
Sadewasser (2006) "Special Cantilever Geometry for the Access of Higher Oscillation Modes in Atomic Force Microscopy," *Appl. Phys. Lett.* 89(3):3.
Sahin et al. (2004) "High-Resolution Imaging of Elastic Properties Using Harmonic Cantilevers," *Sens. Actuators A: Physical* 114(2-3):183-190.
Sberveglieri et al. (Aug. 1997) "Silicon Hotplates for Metal Oxide Gas Sensor Elements," *Microsyst. Tech.* 3:183-190.
Sheehan et al. (Aug. 30, 2004) "Nanoscale Deposition of Solid Inks via Thermal Dip Pen Nanolithography," *Appl. Phys. Lett.* 85(9):1589-1591.

Sheng et al. (Jun. 25, 1998) "A Low-Power CMOS Compatible Integrated Gas Sensor Using Maskless Tun Oxide Sputtering," *Sens. Actuators B. Chem.* 49:81-87.
Shirke et al. (May-Jun. 2007) "Femtomolar Isothermal Desorption Using Microhotplate Sensors," *J. Vac. Sci. Technol. A* 25:514-526.
Solzbacher et al. (2003) "A Comprehensive Analytical and Numerical Analysis of Transient and Static Micro Hotplate Characteristics," In; *Transducers '03*, The 12$^{th}$ international Conference on Solid State Sensors, Actuators and Microsystems, Boston, : 1856-1859.
Solzbacher et al. (Jun. 10, 2000) "A Modular System of SiC-Based Microhotplates for the Application in Metal Oxide Gas Sensors," *Sens. Actuators B Chem.* 64:95-101.
Spannhake et al. (2007) "$SnO_2$: Sb—A New Material for High-Temperature MEMS Heater Applications: Performance and Limitations," *Sens Actuators B Chem.* 124:421-428.
Sprunt et al. (Sep. 1997) "Simultaneous FT-Raman Differential Scanning Calorimetry Measurements Using a Low-Cost Fiber-Optic Probe," *Appl. Spectrosc.* 51:1410-1414.
Stark (2004) "Optical Lever Detection in Higher Eigenmode Dynamic Atomic Force Microscopy," *Rev. Sci. Instrum.* 75(11):5053-5055.
Stark et al. (1999) "Tapping-Mode Atomic Force Microscopy and Phase-Imaging in Higher Eigenmodes," *Appl. Phys. Lett.* 74(22):3296-3298.
Su et al. (2002) "Characterization of a Highly Sensitive Ultra-Thin Piezoresistive Silicon Cantilever Probe and Its Application in Gas Flow Velocity Sensing," *J. Micromech. Microeng.* 12:780-785.
Suehle et al. (Mar. 1993) "Tin Oxide Gas Sensor Fabricated Using CMOS Micro-Hotplates and In situ Processing," *IEEE Electron Dev. Lett.* 14:118-120.
Sunden et al. (2006) "Room-Temperature Chemical Vapor Deposition and Mass Detection on a Heated Atomic Force Microscope Cantilever," *Appl. Phys. Lett.* 88:033107.
Szoszkiewicz et al. (2007) "High-Speed, Sub-15 nm Feature Size Thermochemical Nanolithography," *Nano Lett.* 7:1064-1069.
Thundat et al. (May 23, 1994) "Thermal and Ambient-Induced Deflections of Scanning Force Microscope Cantilevers," *Appl. Phys. Lett.* 64(21):2894-2896.
Thundat et al. (Mar. 27, 1995) "Detection of Mercury Vapor Using Resonating Microcantilevers," *Appl. Phys. Lett.* 66(13):1695-1697.
Thundat et al. (Feb. 1, 1995) "Vapor Detection Using Resonating Microcantilevers," *Anal. Chem.* 67(3): 519-521.
Tortonese et al. (Feb. 22, 1993) "Atomic Resolution with an Atomic Force Microscope Using Piezoresistive Detection," *Appl. Phys. Lett.* 62(8):834-836.
Triantafyllopoulou et al. (2006) "Alternative Micro-Hotplate Design for Low Power Sensor Arrays," *Microelectron. Eng.* 83:1189-1191.
Tsamis et al. (Oct. 15, 2003) "Thermal Properties of Suspended Porous Silicon Micro-Hotplates for Sensor Applications," *Sens. Actuators B Chem.* 95:78-82.
Udrea et al. (Aug. 30, 2001) "Design and Simulations of SOICMOS Micro-Hotplate Gas Sensor," *Sens. Actuators B Chem.* 78:180-190.
Unal et al. (2007) "Nanoscale Quantitative Stress Mapping with Atomic Force Microscopy," *Appl. Phys. Lett.* 90: 113111.
Unal et al. (2006) "Ultrafast Molecule Sorting and Delivery by Atomic Force Microscopy," *Appl. Phys. Lett.* 88: 183105.
Varesi et al. (1998) "Scanning Joule Expansion Microscopy at Nanometer Scales," *Appl. Phys. Lett.* 72(1):37-39.
Vettiger et al. (2002) "The 'Millipede'—Nanotechnology Entering Data Storage," *IEEE Trans. Nanotechnol.* 1:39-55.
Washburn et al. (2005) "Micro-Flame Ionization Detection Using a Catalytic Micro-Combustor," *2005 IEEE Sensors* :322-325.
Wiche et al. (Sep. 23, 2005) "Thermal Analysis of Silicon Carbide Based Micro Hotplates for Metal Oxide Gas Sensors," *Sens. Actuators A. Phys.* 123-124:12-17.
Williams et al (1986) "Scanning Thermal Profiler," *Appl. Phys. Lett.* 49(23):1587-1589.
Wu et al. (2001) "Bioassay of Prostate-Specific Antigen (PSA) using Microcantilevers," *Nat. Biotechnol.* 19:856-860.
Yang et al. (2006) "Nano-Mechanical Electro-Thermal Probe Array Used for High-Density Storage Based on NEMS Technology," *Microelec. Reliability* 46:805-810.

(56) References Cited

OTHER PUBLICATIONS

Zeyen et al. (2007) "Design and test of a novel higher harmonic imaging AFM probe with a dedicated second cantilever for harmonic amplification," Transducers and Eurosensors '07—14th International Conference on Solid-State Sensors, Actuators and Microsystems :1545-1548.
Zeyen et al. (2008) "Preamplifying cantilevers for contact resonance mode imaging," Solid-State Sensors, Actuators, and Microsystems Workshop, Hilton Head Island, South Carolina, Jun. 1-5, 44-47.
Zeyen et al. (2009) "Preamplifying Cantilevers for Dynamic Atomic Force Microscopy," *Appl. Phys. Lett.*, 94:103507.
Zhang et al. (Feb. 14, 2006) "A Micro-Pirani Vacuum Gauge Based on Micro-Hotplate Technology," *Sens. Actuators A Phys.* 126:300-305.
Zhang et al. (Aug. 2007) "Nanoscale Calorimetry Using a Suspended Bridge Configuration," *J. Microelectromech Syst.* 16:861-871.
Zhang et al. (Oct. 15, 2000) "Size-Dependent Melting Point Depression of Nanostructures: Nanocalorimetric Measurements," *Phys. Rev. B. Condens Matter* 62:10548-10557.
Zhang et al. (Jan. 17, 2005) "Thermal Characterization of Liquids and Polymer Thin Films Using a Microcalorimeter," *Appl. Phys. Lett.* 86(3):034101.
Zhong et al. (1993) "Fractured Polymer Silica Fiber Surface Studied by Tapping Mode Atomic-Force Microscopy," *Surf. Sci.* 290(1-2):L688-L692.
French, P.J. (2002) "Polysilicon: A Versatile Material for Microsystems," *Sens Actuators A* 99:3-12.
Rosenman et al. Electron emission from ferroelectrics. Dec. 2000 [retrieved on Sep. 18, 2012]. Retrieved from the Internet: <URL: http://physics.technion.ac.il/~plasma/publications/J_Appl_Phys_88_6109.pdf> p. 619.
Yamashita et al., AN RF-MEMS Device With a Lateral Field-Emission Detector. Jul. 14, 2005 [retrieved on Sep. 18, 2012]. Retrieved from the Internet<URL:http://toshi.iis.u-tokyo.ac.jp/toshilab/?plugin=attach
&refer=Publication%2FInternational%20Conferences
&openfile=IVNC%20abstract.pdf> Abstract; Fig 1.
Rozhko, Acoustoelectron emission from the piezoelectric LiNb03, Sep. 1984. [retrieved on Sep. 18, 2012]. Retrieved from the Internet<URL: http://adsabs.harvard.edu/abs/1984PZhTF..10.1122R> Abstract.
Pavlyk et al., Evolution of metastable centers on the CdS surface stimulated by temperature decrease, Dec. 2001 http://www.dtic.mil/cgi-bin/GetTRDoc?AD=ADA400330> p. 168.
Dadykin, et al., Low-macroscopic-field electron emission from piezoelectric thin films and crystals Institute of Physics. National Academy of Sciences of Ukraine. Dec. 21, 2003 [retrieved on Sep. 18, 2012]. Retrieved from the Internet: URL:http://144.206.159.178/FT/718/562296/12398414.pdf>.Abstract.
International Search Report and Written Opinion dated Oct. 4, 2012, for International Application No. PCT/US12/48326.

\* cited by examiner

TEMPERATURE-DEPENDENT NANOSCALE CONTACT POTENTIAL MEASUREMENT TECHNIQUE AND DEVICE

CROSS REFERENCE TO RELATED APPLICATION

This application is a National Stage Application under 35 U.S.C. §371 of International Application No. PCT/US 09/32545, filed Jan. 30, 2009, which claims the benefit of and priority to U.S. Provisional Application 61/024,962, filed on Jan. 31, 2008, which is hereby incorporated by reference in its entirety.

BACKGROUND OF THE INVENTION

This invention is in the field of atomic force microscope cantilevers. This invention relates generally to an atomic force microscope cantilever having an integrated heater-thermometer and conductive tip, useful for measuring or actuating temperature-dependant electrical potential with nanometer scale resolution.

Microcantilever devices having integrated resistive heaters have found use in the fields of microscopy and information storage. For example, U.S. Pat. Nos. 6,762,402 and 7,038,996 describe microcantilevers having resistively heated tips used for patterning substrates for storage of binary information. Resistive heaters also find use in inducing mechanical oscillation for tapping mode atomic force microscopy measurements, as disclosed in U.S. Patent Application Publication No. US2006/0238206.

In contrast, the microcantilever devices described herein, however, comprise heater-thermometers for controlling or measuring the temperature of a surface. The microcantilever devices described herein also comprise a conductive tip electrically isolated from the resistive heater which allows for temperature dependent Kelvin probe microscopy measurements as well as other uses.

SUMMARY OF THE INVENTION

Provided herein are microcantilevers capable of and/or useful for independently measuring and/or controlling the electrical potential and/or temperature of a surface with nanometer scale position resolution. Also provided herein are methods and devices for manipulating, imaging, and/or mapping a surface or the properties of a surface with a microcantilever. The microcantilevers described herein are also capable of and/or useful for independently measuring and/or controlling the electrical potential and/or temperature of a gas or liquid. The devices and methods of the present invention are useful for applications including gas, liquid, and surface sensing, micro- and nano-fabrication, imaging and mapping of surface contours or surface properties.

In an embodiment, a microcantilever device of the present invention comprises: a cantilever having a fixed end and a free end, a heater-thermometer positioned near the free end of the cantilever, and a conductive tip positioned near the free end of the cantilever, wherein the conductive tip is electrically isolated from the heater-thermometer. As used herein, the expressions "heater-thermometer positioned near the free end of the cantilever" or "conductive tip positioned near the free end of the cantilever" refer to a relative position of the heater-thermometer or conductive tip between 0 and 200 µm of the cantilever free end, preferably for some applications between 0 and 50 µm or between 0 and 25 µm of the free end of the cantilever. This expression also includes embodiments where at least a portion of the heater-thermometer or conductive tip is spatially coincident with the free end of the cantilever. The microcantilever devices of the present invention may further comprise one or more electrodes electrically connected to the heater-thermometer and/or the conductive tip.

In an embodiment, a microcantilever of the present invention is capable of producing and/or produces a temperature change in a surface. According to this aspect, a temperature change can be effected by bringing the tip of the microcantilever close to (e.g., within 500 nm or 1 µm), in thermal contact, in physical contact, or in electrical contact with the surface and providing a current to the heater-thermometer to heat a portion of the microcantilever adjacent to the tip. In this embodiment, the heater-thermometer and tip will reach a specified temperature which can be controlled and monitored; after this, the surface close to, in thermal contact, in physical contact, or in electrical contact with the tip will have thermal interaction with the tip, thereby producing a change in the temperature of the surface. In an exemplary embodiment, the heater-thermometer comprises a thermistor, such that the temperature can be monitored by measuring the resistance of the thermistor.

In another embodiment, a microcantilever of the present invention is capable of measuring and/or measures the temperature of a surface. In embodiments where the microcantilever measures a surface temperature, the microcantilever tip is brought close to, in thermal contact, in physical contact, or in electrical contact with a surface and allowed to have thermal interaction with the surface. Subsequently, a signal from a temperature sensor near the tip of the microcantilever can be measured and the temperature determined. In an exemplary embodiment, the temperature sensor comprises a heater-thermometer. A heater-thermometer can be useful for simultaneously or independently controlling and/or sensing the temperature.

In another aspect, a microcantilever is capable of producing and/or produces a change in the electrical potential of a surface. In an embodiment of this aspect, the tip of the microcantilever is coated with and/or comprised of an electrically conductive material, and a voltage is provided to the tip, and thereby affects a change in the electrical potential of a surface when the tip is brought close to or in physical or electrical contact with the surface. In another embodiment, a microcantilever of the present invention is capable of sensing or measuring and/or senses or measures the electrical potential of a surface by bringing a conductive microcantilever tip close to or in physical or electrical contact with the surface and measuring the electrical potential of a the tip.

In an exemplary embodiment, a microcantilever of the present invention is independently capable of simultaneously measuring, sensing, and/or controlling the temperature and/or electrical potential of a surface. For example, a microcantilever of a specific embodiment simultaneously controls the temperature of a surface while measuring the electrical potential of the surface, or simultaneously measures the temperature of a surface while controlling the electrical potential of the surface. In an exemplary embodiment, a microcantilever is capable of providing nanometer resolution mapping of the contours, height or profile of a surface, the temperature of a surface, the electrical potential of a surface, or any combination of these. In these embodiments, the microcantilever is fabricated with both a heater-thermometer and a conductive tip. In some embodiments, it is preferred that the conductive tip of the cantilever is electrically isolated from the heater-thermometer. In some embodiments, it is also preferred that any leads electrically connected to the heater-thermometer are electrically isolated from any leads electrically connected to the conductive tip.

In another exemplary embodiment, a microcantilever is capable of providing and/or provides nanometer resolution mapping of the contours, height or profile of a surface as a function of temperature while simultaneously mapping the electrical potential of the surface as a function of temperature. In embodiments where the contours, height or profile of the surface are mapped, methods well known in the art of atomic force microscopy and/or scanning tunneling microscopy can be used. Methods for mapping the contour profile of a surface include, but are not limited to: using a laser spot reflected from the top of the cantilever into an array of photodiodes, optical interferometry, capacitive sensing, piezoresistive or piezoelectric sensors within the cantilever, measurement of tunneling current, or any combination of these or other methods useful for sensing the surface profile.

In another aspect, provided is a method of sensing an attribute of a surface, the method comprising the steps of: providing a surface; providing a microcantilever device of the present invention having a conductive tip close to, in thermal contact, or in physical contact with the surface; allowing the conductive tip to have thermal interaction with the surface; and measuring an electrical property of the conductive tip or a heater-thermometer of the microcantilever, thereby sensing an attribute of the surface. Useful electrical properties to sense an attribute of a surface comprise the resistance across the heater thermometer, and the electrical potential of the conductive tip. In an exemplary embodiment, attributes capable of being sensed comprise the temperature of the surface, the electrical potential of the surface, and both the temperature and electrical potential of the surface. In an embodiment, the temperature of the surface can be sensed by measuring a resistance of the heater-thermometer. In an embodiment, the electrical potential of the surface is sensed by measuring a voltage or electric potential of a conductive tip of the microcantilever device.

In another aspect, the present invention provides a method of controlling an attribute of a surface, the method comprising the steps of: providing a surface; providing a microcantilever device of the present invention having a conductive tip close to, in thermal contact, in physical contact, or in electrical contact with the surface; providing a voltage and/or current to the conductive tip or a heater-thermometer of the microcantilever device, and allowing the surface to have thermal interaction with one or more portions of the microcantilever device.

Surface attributes useful for controlling with the methods described herein comprise the temperature of the surface, the electric potential of the surface, and both the temperature and electric potential of the surface. In an embodiment, control of the temperature is controlled by providing a current to a heater-thermometer portion of the microcantilever device. In an embodiment, control of the electrical potential of the surface is achieved by providing a voltage to a conductive tip of the microcantilever device.

In another aspect, the present invention also provides a method of manipulating a surface, the method comprising: providing a surface; providing a microcantilever device of the present invention close to, in thermal contact, in physical contact, or in electrical contact with the surface; and providing a voltage and/or current to a conductive tip and/or heater-thermometer of the microcantilever device. This method may optionally further comprise: allowing the surface to have thermal interaction with the heater-thermometer portion of the microcantilever device and providing a second current and/or voltage to the conductive tip and/or heater-thermometer microcantilever device. In an exemplary embodiment, the first voltage and/or current results in a temperature change of the heater-thermometer portion of the microcantilever device and/or the surface and the second voltage and/or current provided results in a manipulation of the surface, effectively manipulating the surface at a fixed and/or controlled temperature.

Surface manipulations useful with the methods described herein comprise: changing the physical state of the surface, for example from a solid to a liquid or a gas; heating the surface; cooling the surface; changing or inducing a magnetic orientation of the surface; changing the level of oxidation of the surface; creating a glass transition in the surface; injecting electrons into the surface; driving a current into or through the surface; depositing material onto the surface; and any combination of these or other useful surface manipulations.

The microcantilever devices of some embodiments can also be used to sense or control the temperature and/or electrical potential of a liquid or a gas surrounding the microcantilever device. In an embodiment, a microcantilever of the present invention is capable of producing and/or produces a temperature change in a liquid or a gas or is capable of determining and/or determines the temperature of a liquid or a gas. According to this aspect, a temperature change can be affected by bringing the tip of the microcantilever, in thermal contact, in physical contact, or in electrical contact with the liquid or gas and providing a current or voltage to the heater-thermometer to heat a portion of the microcantilever adjacent to the tip. In this embodiment, the heater-thermometer and tip will reach a specified temperature which can be controlled and monitored; after this, the liquid or gas in thermal contact, in physical contact, or in electrical contact with the tip will have thermal interaction with the tip, thereby producing a change in the temperature of the liquid or gas. In embodiments where the temperature of the liquid or the gas is determined, the tip of the microcantilever is brought into thermal, physical, or electrical contact with the liquid or the gas and allowed to have thermal communication with the liquid or the gas. Subsequently the temperature of the liquid or gas is determined by measuring an electrical property of the heater-thermometer.

In another embodiment, a microcantilever of the present invention is capable of producing and/or produces a change in or is capable of determining and/or determines the electrical potential of a liquid or a gas. According to this aspect, a change in the electrical potential can be effected by bringing the tip of the microcantilever into thermal contact, physical contact, or electrical contact with the liquid or gas and providing a current or voltage to the conductive tip. In embodiments where the electrical potential of the liquid or the gas is determined, the tip of the microcantilever is brought into thermal contact, physical contact, or electrical contact with the liquid or gas and the voltage of the conductive tip subsequently determined.

In an exemplary embodiment, the present invention provides a method of manipulating a surface. A method of this aspect comprises providing a surface, providing a microcantilever device of the present invention having a conductive tip and a heater-thermometer in thermal, physical, or electrical contact with a gas or liquid between or near the surface and the microcantilever, and providing a voltage or current to the heater-thermometer, the conductive tip, or both. In some embodiments, the temperature or electrical potential of the liquid or gas is changed by the voltage or current provided to the heater-thermometer, the conductive tip, or both, and the gas or liquid having undergone a temperature or electrical potential change subsequently reacts with the surface, thereby manipulating or modifying the surface. In another embodiment, the current or voltage provided to the heater-thermometer, the conductive tip, or both cause a discharge from the conductive tip to the liquid or gas. Subsequently, the gas or liquid present in the discharged region undergoes a chemical or physical reaction with the surface, thereby modifying the surface.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

DETAILED DESCRIPTION OF THE INVENTION

Figure 1:
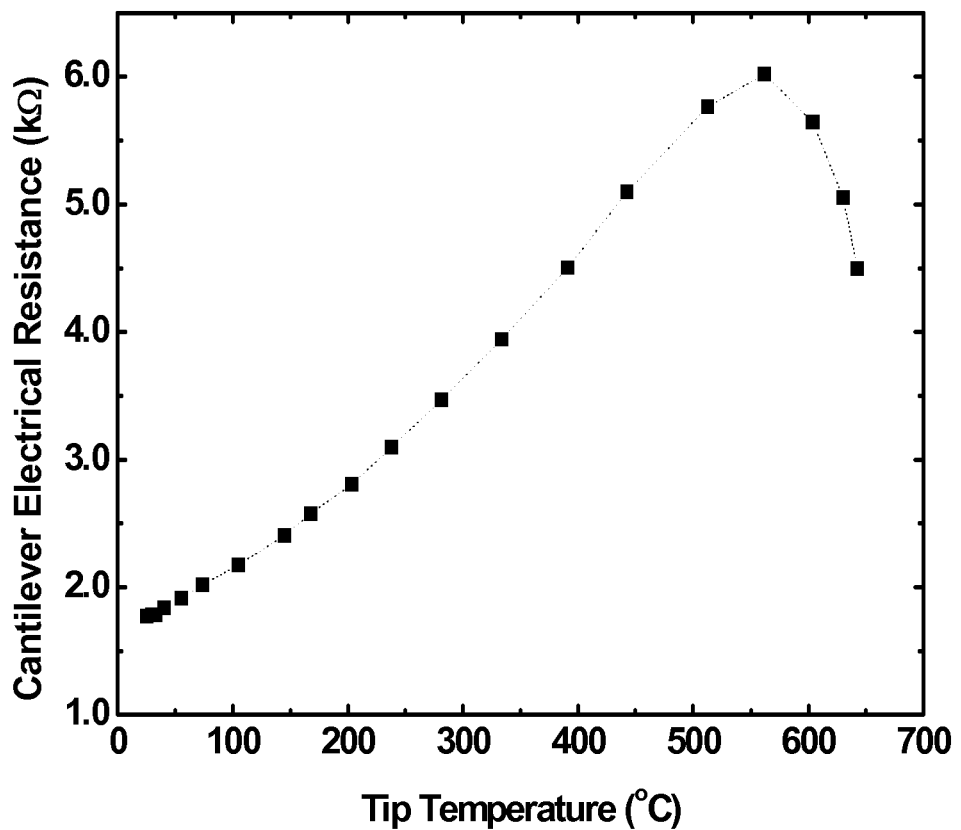
FIG. 1 provides example data showing that the tip temperature can be calibrated as a function of the electrical resistance.

In general the terms and phrases used herein have their art-recognized meaning, which can be found by reference to standard texts, journal references and contexts known to those skilled in the art. The following definitions are provided to clarify their specific use in the context of the invention.

"Heater-thermometer" refers to a combination of a device for determining temperature and a device for actuating the temperature. In an embodiment, a thermistor is useful as a heater-thermometer. A thermistor refers to a resistive material which has a resistance which is temperature dependant. Providing a current or voltage to a thermistor can result in an increase in the temperature of the thermistor through resistive heating. Since the resistance of a thermistor is temperature dependent, it can be used as means for measuring the temperature; i.e., by measuring the resistance of the thermistor, the temperature of the thermistor can be determined. A thermistor useful with some embodiments of the present invention comprises doped silicon, for example silicon doped with a phosphorus concentration of about $1\times10^{17}$ cm$^{-3}$. A heater-thermometer can refer to a single or separate distinct elements for measuring and actuating the temperature, for example a thermistor or a thermocouple and a resistive heater.

"Thermal steady state" refers to a condition of a material or element at which the temperature of the material or element is substantially constant, for example a condition where the temperature changes at a rate of less than 5 K/minute. Thermal steady state can also refer to a condition of thermal equilibrium or a condition where the heat input is substantially equal to the heat losses and/or heat output.

"Thermal communication" and "thermal contact" refers to an orientation or position of elements or materials, such as a heater-thermometer and a conductive tip, such that there is more efficient transfer of heat between the two elements than if isolated or thermally insulated. Elements or materials may be considered in thermal communication or contact if heat is transported between them more quickly than if they were isolated or thermally insulated. Two elements in thermal communication or contact may reach thermal equilibrium or thermal steady state and in some embodiments may be considered to be constantly at thermal equilibrium or thermal steady state with one another. In some embodiments, elements in thermal communication with one another may be separated by a distance of 1 µm or less.

"Thermal insulation" refers to a material that is used to reduce the rate of heat transfer. In one aspect, thermal insulation reduces the rate of heat transfer between elements or materials to a rate less than the rate when the elements or materials are in physical contact.

"Electrical isolation" refers to elements or materials which are not electrically connected, in electrical contact, or in electrical communication. In one aspect, electrical isolation can be provided by physical separation of elements or materials, i.e. the elements or materials are not in physical contact. In this aspect, the elements or materials may be spatially separated or separated by an electrically insulating material. In another aspect, electrical isolation can be provided by a difference in the electrical properties of a material or element. For example, a metal or conductive material can be considered electrically isolated from a non-conductive or electrically insulating material even though the materials are in physical contact. Due to a difference in electrical properties, conducting materials may be considered to be in electrical isolation from one another even if they are in physical contact; for example, since current is permitted to flow in only one direction across a diode junction, the two sides of a diode may be considered to be electrically isolated from one another when considered in one direction and may be considered to be electrically connected to one another when considered in the opposite direction.

"Cantilever" and "microcantilever" are used interchangeably herein and refer to a structure having one fixed or attached end and one free or unattached end, for example a cantilever of an atomic force microscope. In some embodiments, the cantilevers of the present invention have dimensions on the order of 10 to 1000 µm. The cantilevers useful in the present invention include, but are not limited to, cantilevers having any useful shape, including platform or rectangular shaped cantilevers, circular shaped cantilevers, ladder shaped cantilevers, U-shaped cantilevers, serpentine shaped cantilevers, and cantilevers having cutout portions.

In one aspect, the present invention provides a microcantilever device useful for investigating properties of a surface, as well as for making modifications to a surface. In another aspect, the present invention provides methods of probing, sensing, or controlling the properties of a surface, such as the temperature or electrical potential of a surface. In yet another aspect, the present invention provides methods of modifying surfaces, such as selectively depositing material onto a surface, selectively heating regions of a surface, selectively changing the physical state of regions of a surface, selectively cooling regions of a surface, selectively changing or inducing a magnetic orientation of a region of a surface, selectively changing the level of oxidation of a region of a surface, selectively creating a glass transition in a region of a surface, or selectively injecting electrons into a region of surface. In the context of this description, the term "selectively" refers to processes wherein a portion or region of a surface having a selected position is manipulated. The microcantilever devices of some embodiments are useful for probing and modifying surfaces with nanometer scale resolution.

In an embodiment, a device of the present invention comprises a cantilever having a fixed end and a free end. Useful cantilevers include those having any shape. In general, cantilevers are capable of being manufactured in a variety of ways, including methods known in the art of silicon-on-insulator (SOI) fabrication. Exemplary cantilevers useful in the present invention comprise crystalline or polycrystalline silicon. Cantilevers useful in some embodiments of the present invention may also comprise one or more regions of doped semiconductor, such as phosphorus or boron doped silicon, or n-type or p-type silicon, or doped diamond, or one or more regions of an insulating material, such as silicon oxide or silicon nitride. Cantilevers of the present invention are capable of being used in an atomic force or other type of surface probe microscope. Cantilevers of embodiments of the present invention are capable of being constructed in a variety of forms, including cantilevers having one or more supporting legs.

In an embodiment, a device of the present invention comprises one or more electrodes positioned along a cantilever. In some embodiments, the electrodes comprise one or more legs of a cantilever. In an exemplary embodiment, electrodes useful in the present invention comprise doped semiconductor, for example doped silicon or doped diamond. In other exemplary embodiments, electrodes useful in the present invention comprise a metal, for example tungsten, gold, aluminum, platinum, nickel, or any other metal. In some embodiments, an electrode may comprise a metal coating. In some applications, doped semiconductor is preferred over metallic electrodes since doped semiconductor may be capable of withstanding higher temperatures where some metals will melt, for example temperatures up to 1250° C. Doped semiconductor may also be preferred for some applications since it may be capable of supporting a higher current density than a metal electrode of similar dimensions. In other applications, metallic electrodes may be preferred over doped semiconductor, due to the relatively lower electrical resistance of many metals. The level of doping in doped semiconductor, however, can be selectively adjusted to create regions of doped semiconductor having higher or lower resistances. Regions of doped semiconductor having low resistances can be useful as electrodes or electrical interconnections. Regions of doped semiconductor having higher resistances can be useful as resistive heaters or thermistors or heater-thermometers.

In an embodiment, a device of the present invention also comprises a heater-thermometer, positioned near the free end of a cantilever. In an exemplary embodiment, a heater-thermometer is capable of heating and/or heats the end of a cantilever on which it is integrated as well as the surface. Heat may be produced in a heater-thermometer by providing a current and/or voltage to the heater-thermometer or to electrodes electrically connected to the heater-thermometer; in this way, the heater-thermometer can be resistively heated. Useful heater-thermometers are also capable of determining and/or determine the temperature of a cantilever. In an embodiment, by determining the resistance of the heater-thermometer, the temperature of the heater-thermometer and/or cantilever can be determined to high precision, for example to a precision of 5° C. or, more preferably, 1° C. FIG. 1 provides data showing results of Raman microscopy calibration of the cantilever temperature and indicate that the temperature can be calibrated as a function of the electrical resistance of the heater-thermometer, in this case with a precision of 5° C.

In an embodiment, a device of the present invention is also comprised of a conductive tip positioned near the free end of a cantilever. Useful tips include tips which are capable of use in an atomic force microscope, such as a tip with a very small radius of curvature. In an embodiment preferred for some applications, the conductive tip is comprised of a metal or a metal coating. In another embodiment, the conductive tip is electrically connected to an electrode portion of the cantilever. In an embodiment, the conductive tip is comprised of a hard, patternable metal, for example aluminum, gold, tungsten, platinum, or nickel. In another embodiment, a conductive tip is comprised of a doped semiconductor, for example doped diamond or doped silicon or other doped semiconductor. In a preferred embodiment, the conductive tip and any electrode to which it is electrically connected are comprised of the same material. In addition to other uses, a conductive tip can be useful for microscopy, nanolithography, and dip-pen nanolithography. A conductive tip is also useful for probing, sensing, or controlling the potential of a surface, for example by providing or measuring a voltage the conductive tip or of an electrode electrically connected to the conductive tip.

In a preferred embodiment, a conductive tip is electrically isolated from other components of the cantilever, for example a heater-thermometer and any electrodes electrically connected to the heater-thermometer. Electrical isolation may be provided in a variety of methods, including physical separation or use of a layer of an electrically insulating material between the conductive tip and heater-thermometer. Useful electrically insulating materials include, but are not limited to, undoped silicon, silicon oxide, silicon nitride, diamond, and polymers. In some embodiments the electrically insulating material is thermally conductive and allows for thermal communication between the conductive tip and the heater-thermometer; in other embodiments, the electrically insulating material also provides thermal insulation between the conductive tip and the heater-thermometer. In an embodiment, a conductive tip is in thermal communication with a heater-thermometer on the same cantilever, whereby the conductive tip has a temperature within 10 K of that of the heater-thermometer. In some embodiments, the conductive tip and heater-thermometer may be spatially offset from one another; in other embodiments, the conductive tip and heater-thermometer may be adjacent to or on top of one another.

Figure 2:
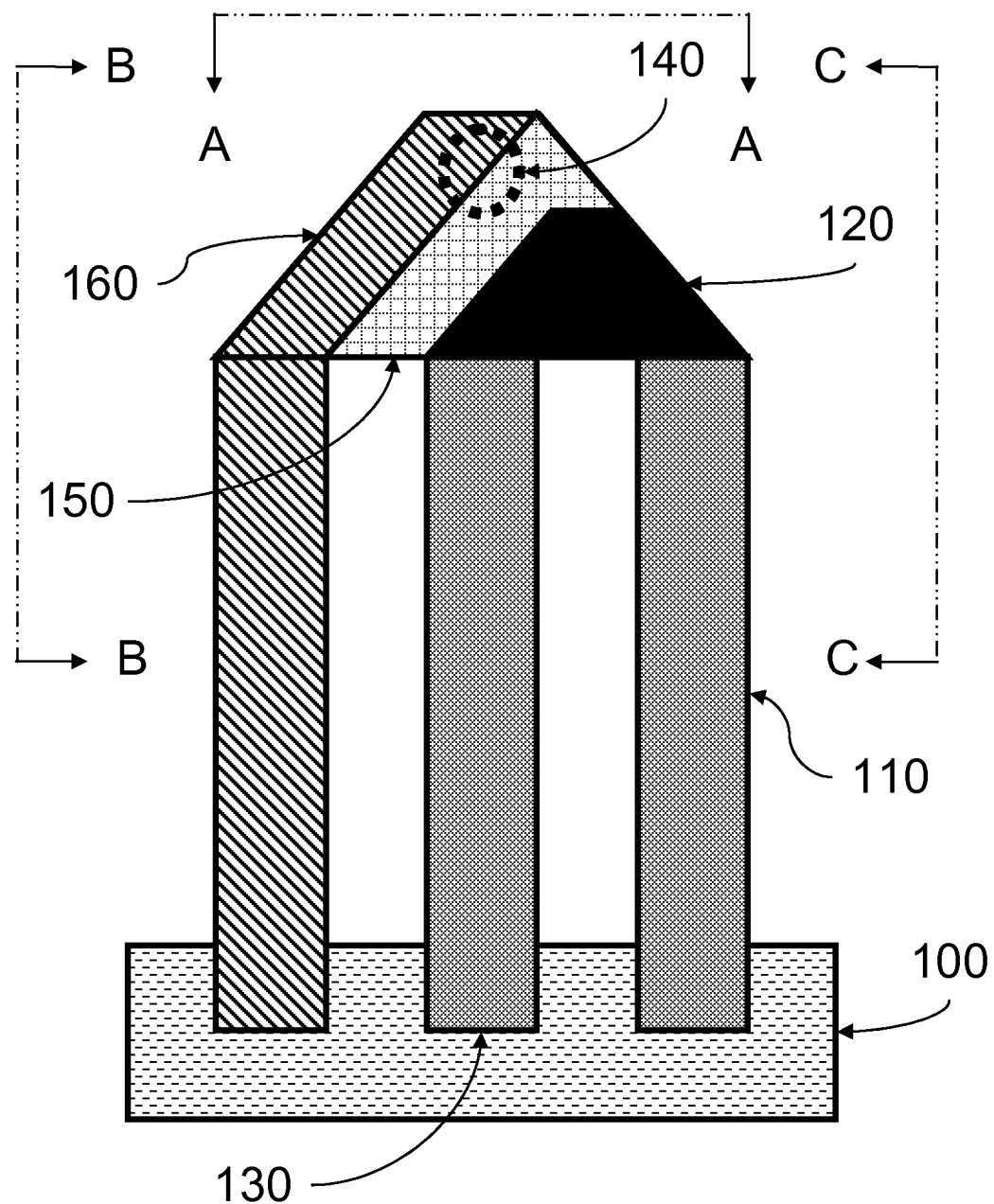
FIG. 2 provides a schematic showing an overhead view of a first embodiment of a microcantilever device.

Referring now to the drawings, FIG. 2 shows a first preferred embodiment of a microcantilever device of the present invention. In this embodiment, the microcantilever is supported by a holder chip 100 which may be patterned to provide electrical connections to various electrical leads on the microcantilever. In this embodiment, a first electrode 110 is comprised of highly doped silicon such that it has a relatively low resistance, for example a resistance less than 10% of the resistance of the heater-thermometer 120. In this embodiment, first electrode 110 comprises one leg of the cantilever. Electrically connected to first electrode 110 is heater-thermometer 120 near the free end of the cantilever, which, in some embodiments, is comprised of doped silicon such that it has a higher resistance than the first electrode 110 or a second electrode 130. In this embodiment, second electrode 130 is also comprised of highly doped silicon such that it has a relatively low resistance. On the bottom of the free end of the cantilever there is a conductive tip 140. In this embodiment, conductive tip 140 resides partially on insulating material 150 which provides electrical isolation between conductive tip 140 and heater-thermometer 120. Insulating material 150 also provides electrical isolation between heater-thermometer 120 and third electrode 160. Comprising part of the free end of the cantilever, as well as a leg of the cantilever, is third electrode 160, which is comprised of a metal coating on the silicon substrate. Third electrode 160 is electrically connected to conductive tip 140.

Figure 3:
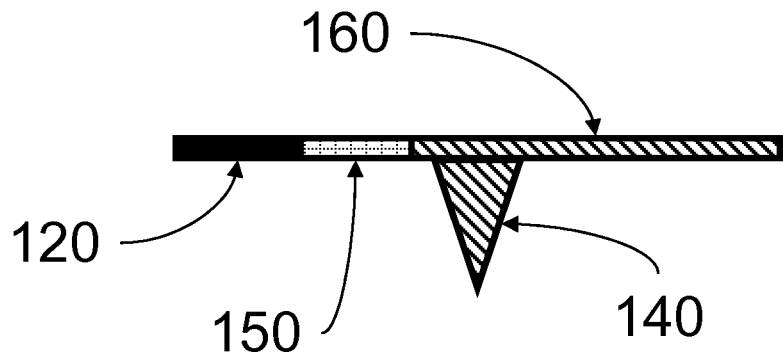
FIG. 3 provides a schematic showing a front view of a first embodiment of a microcantilever device.
Figure 4:
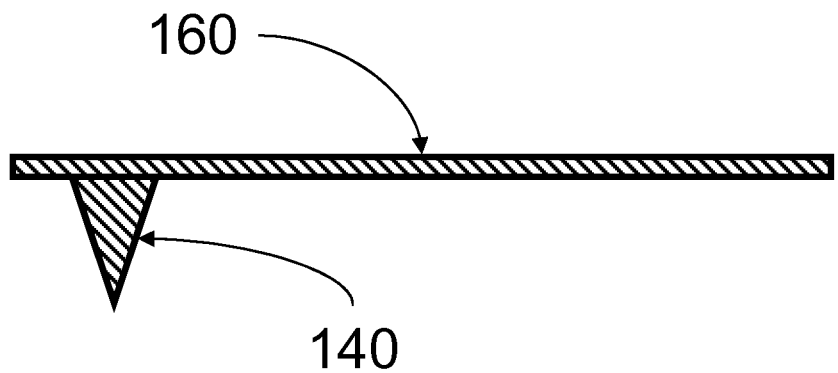
FIG. 4 provides a schematic showing a side view of a first embodiment of a microcantilever device.
Figure 5:
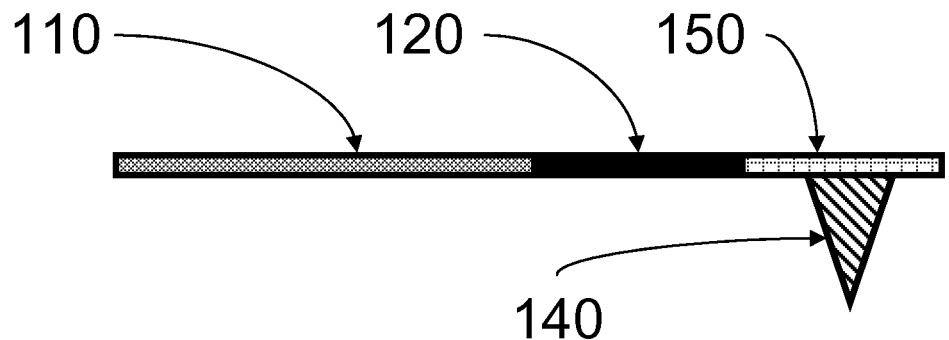
FIG. 5 provides a schematic showing a side view of a first embodiment of a microcantilever device.

FIG. 3 shows a view of the first preferred embodiment in the A-A direction. Heater-thermometer 120 is partially shown and attached to insulating material 150 which provides electrical isolation between conductive tip 140 and third electrode 160. FIG. 4 shows a view of the first preferred embodiment in the B-B direction, showing conductive tip 140 and third electrode 160. FIG. 5 shows a view of the first preferred embodiment in the C-C direction, showing first electrode 110, heater-thermometer 120, insulating material 150 and conductive tip 140. The first embodiment shows the heater-thermometer and conductive tip spatially offset from one another, and also shows the cantilever as a single layer; however, cantilevers of the present invention can comprise multiple layers.

Figure 6:
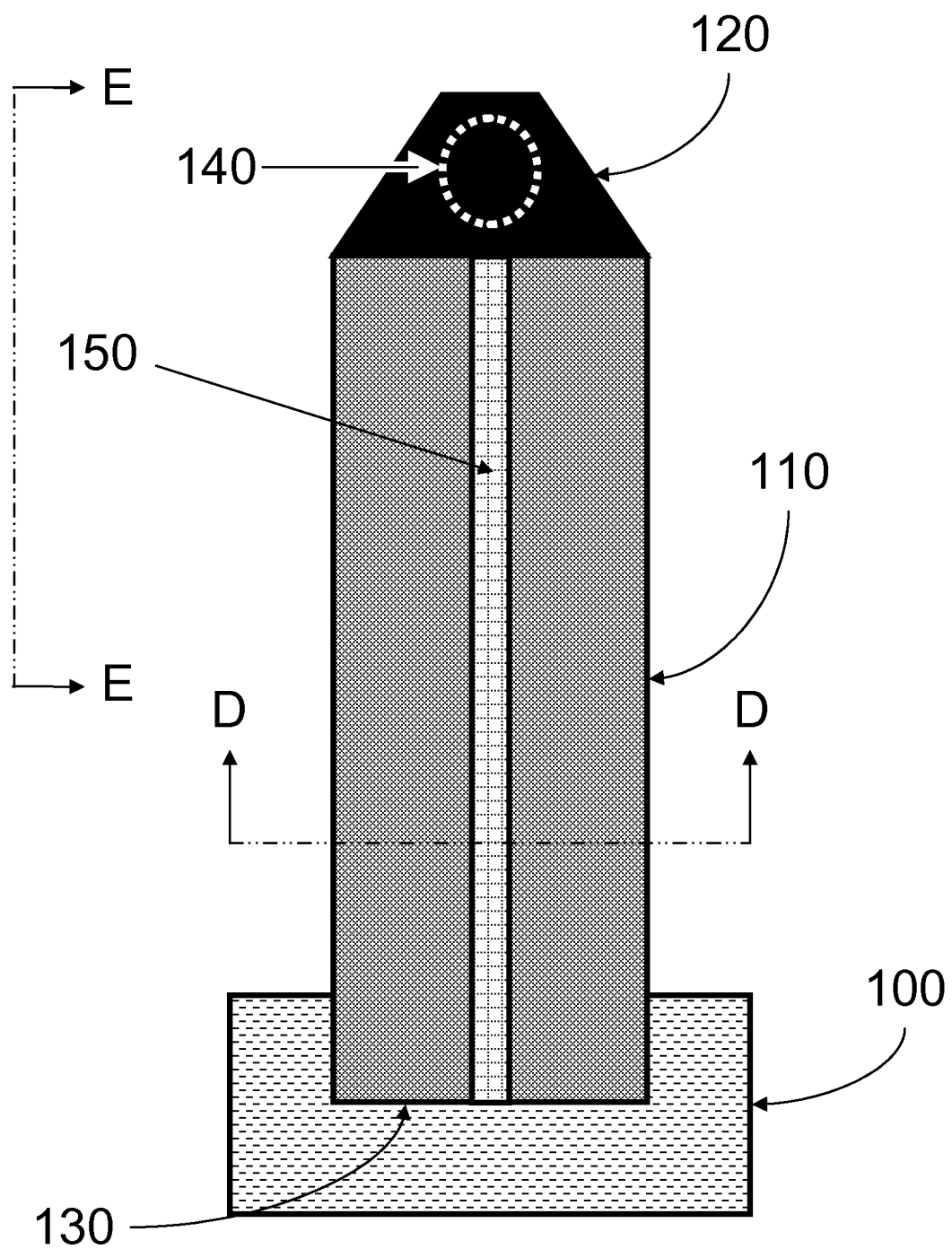
FIG. 6 provides a schematic showing an overhead view of a second embodiment of a microcantilever device.
Figure 7:
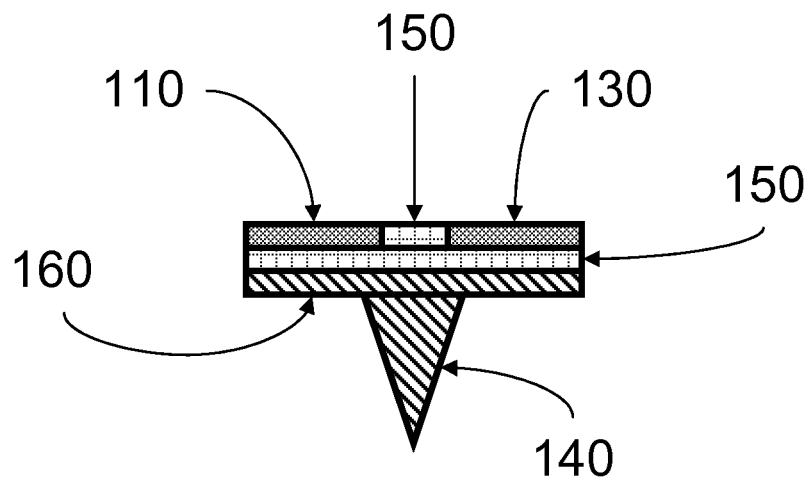
FIG. 7 provides a schematic showing a rear view of a second embodiment of a microcantilever device.
Figure 8:
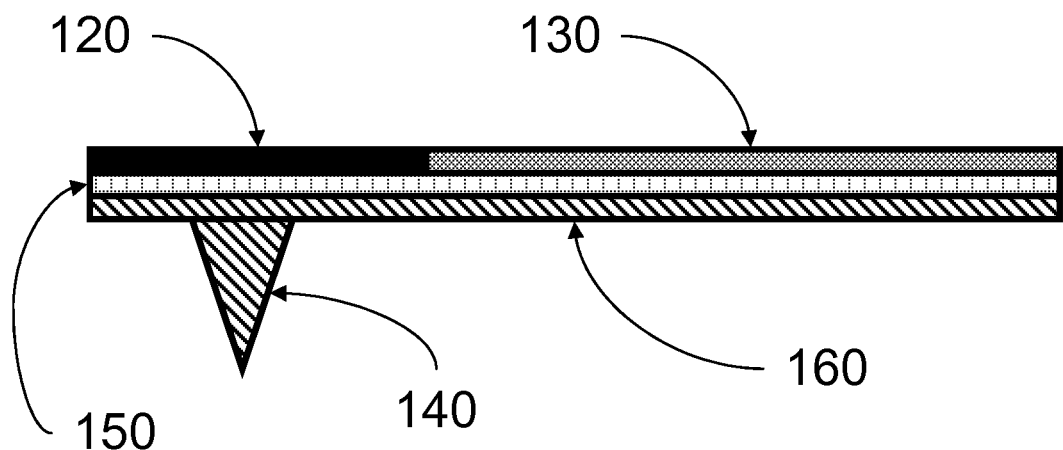
FIG. 8 provides a schematic showing a side view of a second embodiment of a microcantilever device.
Figure 9:
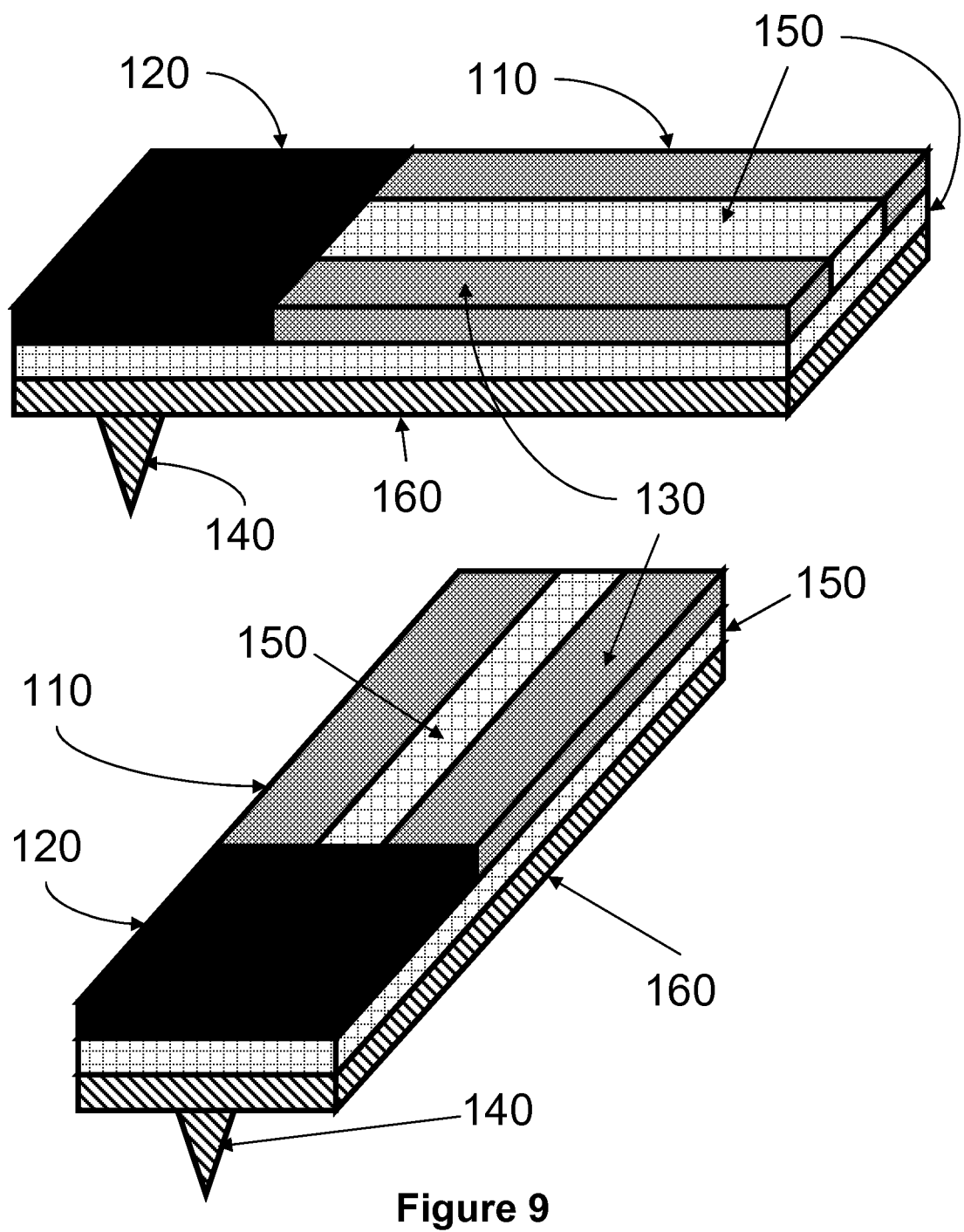
FIG. 9 provides perspectives views of a second embodiment of a microcantilever device.

FIG. 6 shows a second preferred embodiment of a microcantilever device of the present invention comprising multiple layers. In this embodiment, the topmost layer is comprised of first electrode 110, heater-thermometer 120, second electrode 130, and insulating material 150. FIG. 7 shows a cross sectional view of the second preferred embodiment in the D-D direction, and shows that the topmost layer is separated from the bottommost layer, which comprises third electrode 140, by a middle layer comprising insulating material 150. FIG. 8 shows a view of the second preferred embodiment in the E-E direction, showing that heater-thermometer 120 is located on top of conductive tip 140. FIG. 9 shows perspective views of an additional interpretation of the second preferred embodiment.

Figure 10:
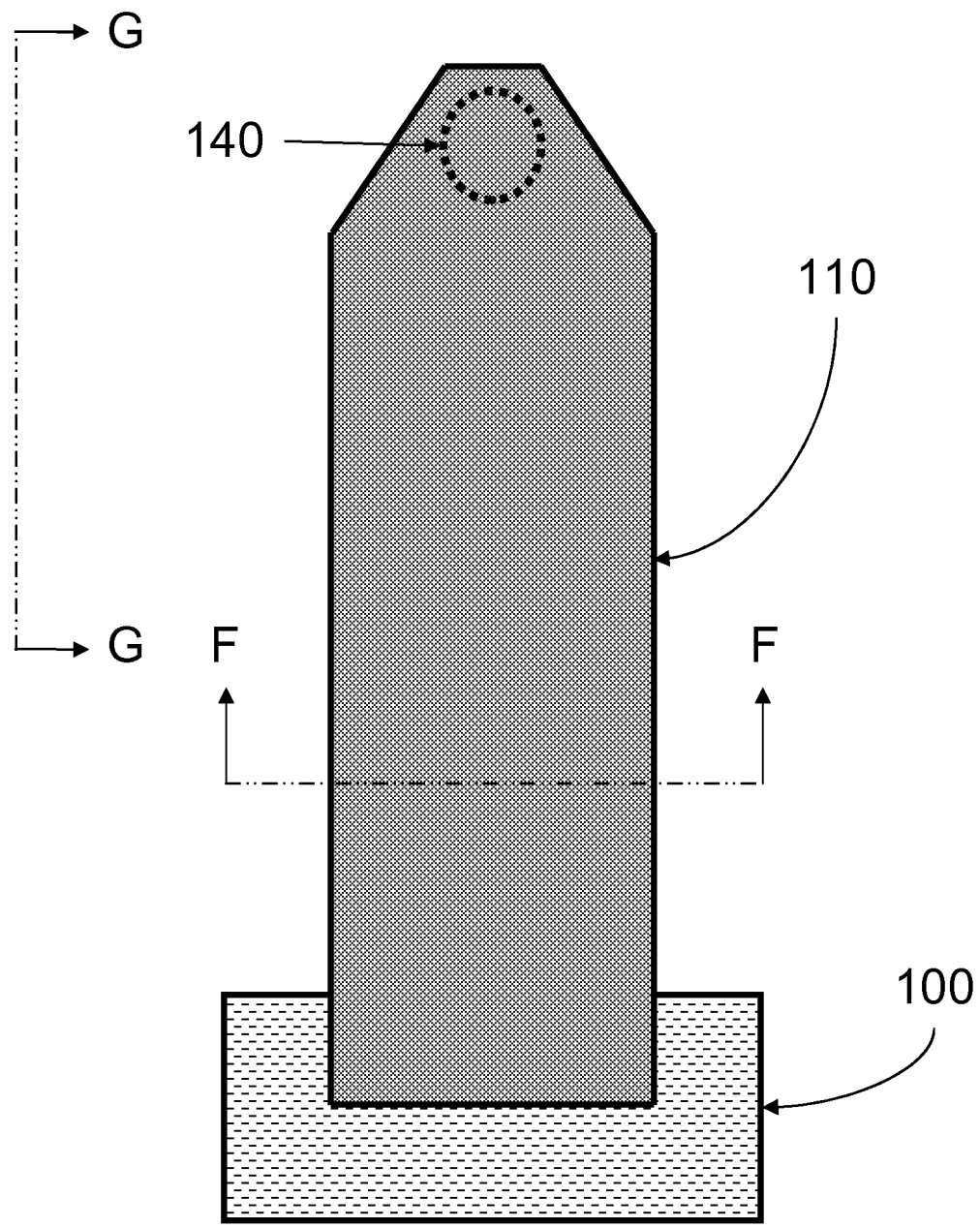
FIG. 10 provides a schematic showing an overhead view of a third embodiment of a microcantilever device.
Figure 11:
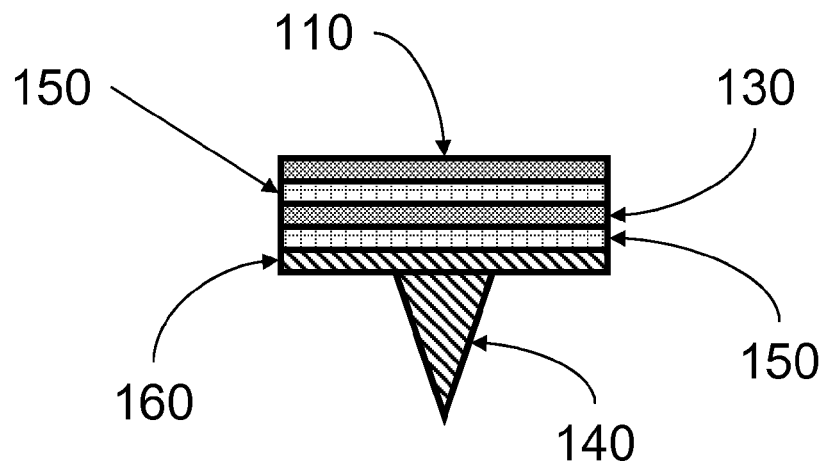
FIG. 11 provides a schematic showing a rear view of a third embodiment of a microcantilever device.
Figure 12:
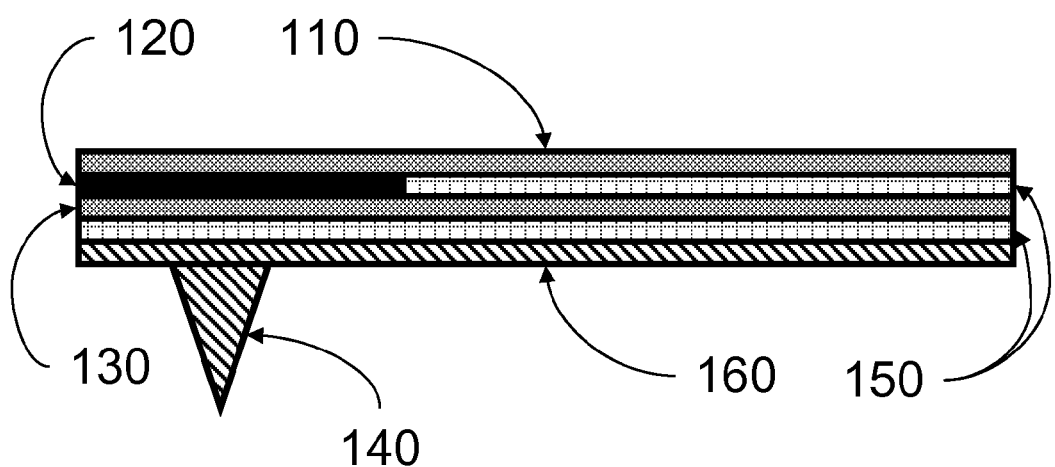
FIG. 12 provides a schematic showing a side view of a third embodiment of a microcantilever device.
Figure 13:
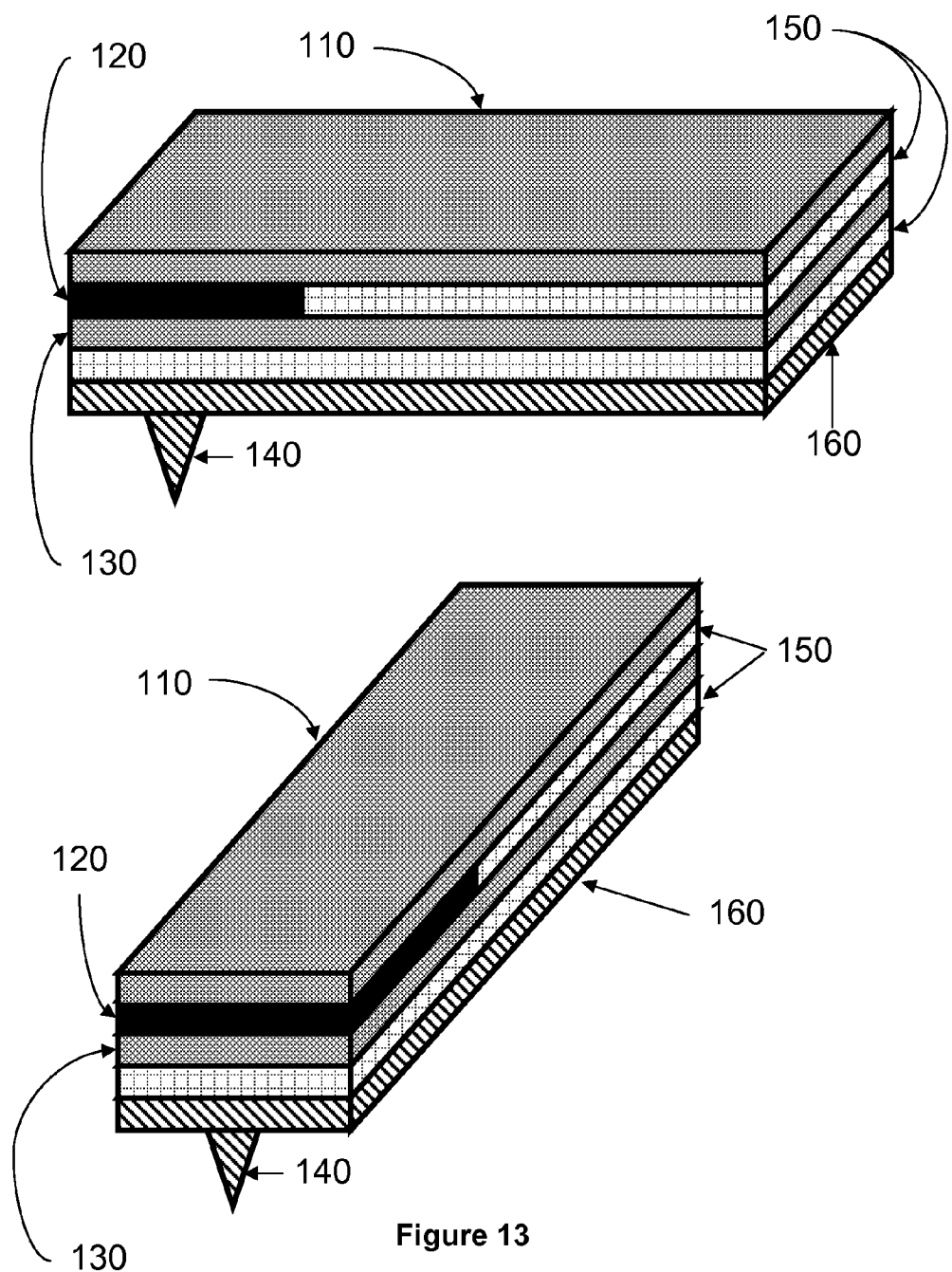
FIG. 13 provides perspective views of a third embodiment of a microcantilever device.

FIG. 10 shows a third preferred embodiment of a microcantilever device of the present invention comprising multiple layers. In this embodiment, the topmost layer is comprised substantially of first electrode 110. FIG. 11 shows a cross sectional view of the third preferred embodiment in the F-F direction and FIG. 12 shows a view in the G-G direction. Here, the topmost layer comprises first electrode 110. The next layer is partially comprised of insulating material 150 and partially comprised of heater-thermometer 120. In this embodiment, heater-thermometer 120 is located above conductive tip 140. The next layer is comprised of second electrode 130 which is located above a second insulating material 150. The bottommost layer in this embodiment comprises third electrode 160. FIG. 13 shows perspective views of an additional interpretation of the third preferred embodiment.

It will be appreciated from the foregoing that microcantilever devices of the present invention can be constructed in many different embodiments. The preferred embodiments described above are not intended to limit the invention which is defined by the following claims.

The invention may be further understood by the following non-limiting examples.

EXAMPLE 1

Design and Fabrication of a Microcantilever Having an Integrated Electrode and Heater Element The AFM cantilevers of the present invention comprise an integrated resistive heating element and an electrically-addressable metal-coated tip. The resistive heater is capable of reaching temperatures exceeding 1000° C. The microcantilevers of the present invention are calibrated such that the tip temperature can be controlled to within 1° C. Ideal cantilevers have a spring constant in the range 0.1-1 N/m and have a resonant frequency in the range of 30 kHz. These cantilevers can be used in either tapping mode or contact mode operation.

FIG. 2 shows a schematic of an exemplary cantilever of the present invention. The cantilever is made of single-crystal silicon. Some of the silicon is doped, in a process described below, in order to achieve cantilever heating. The cantilever has three legs—two of the legs are made of heavily doped silicon to carry electrical current, and the third leg is made of metal-coated silicon. The metal electrode of the third leg extends to the tip and coats the tip at the end of the cantilever. The electrical potential at the end of the sharp tip can be read from the electrode leg. The doped silicon legs carry current to the heater region near the free end of the cantilever. The heater region of the cantilever is made of doped silicon. The legs have a higher doping concentration than the heater region, such that the legs are highly conducting and the heater region is somewhat more resistive. Doped silicon legs are preferred for delivery of current to the heater region rather than metal, because a metal leg would not be able to carry the current required for heating without exceeding its current density limit. The metal electrode is selected for the electrical potential measurement, and is preferred over doped silicon because it has very low electrical resistivity.

The heated AFM cantilevers are fabricated using a standard silicon-on-insulator (SOI) process known in the art, but modified to accommodate the electrode required for the Kelvin Probe measurements. The fabrication process starts with a SOI wafer of orientation <100>, n-type doping at $2\times10^{14}$ $cm^{-3}$ having a resistivity of approximately 4Ω-cm. The cantilever tips are formed using an oxidation sharpening process, which can achieve a tip radius of curvature of 20 nm or smaller. The silicon of the cantilever is made electrically active through two phosphorous doping steps: first, two parallel cantilever legs are doped to $1\times10^{20}$ $cm^{-3}$ and the heater region near the free end of the cantilever is doped to $1\times10^{17}$ $cm^{-3}$. The heater region is more resistive than the rest of the cantilever, such that when electrical current flows through the legs of the cantilever, heating occurs primarily in the highly resistive region near the free end of the cantilever. With the cantilever dimensions and temperature-dependent resistivities well defined, the cantilever electrical resistance depends on the cantilever temperature solely in the heater region to within 10%. Finally, the cantilever metal is patterned to form the tip electrode and the electrical connections to the doped silicon.

Metals for the tip electrode are selected from the group comprising tungsten, gold, and aluminum, platinum, nickel, and any other hard, patternable metal useful for standard deposition and microfabrication processes. These metals are useful because the metal is deposited and patterned using standard microfabrication processes, and must be sufficiently hard such that it does not deform considerably during scanning contact with a hard surface. The work function of the metal coating is also an important consideration for potential measurements.

The cantilever temperature can be calibrated using infrared (IR) and Raman microscopy. FIG. 1 shows results of Raman microscopy calibration of the cantilever temperature, in this case with a precision of 5° C. The cantilever electrical resistance depends very strongly upon temperature and thus it is possible to control the cantilever tip temperature by monitoring the cantilever electrical resistance.

In the cantilever schematic of FIG. 2, the cantilever heater is spatially offset from the metal electrode. As the tip and heater are in thermal contact, the tip temperature can be calibrated even though it is offset from the heater. Alternatively, the heater can be located directly on top of the tip, as shown in FIGS. 6-9, in which case the electrode is electrically isolated from the heater, for example by a thin film passivation layer such as silicon dioxide.

REFERENCES

B. W. Chui, T. D. Stowe, Y. S. Ju, K. E. Goodson, T. W. Kenny, H. J. Mamin, B. D. Terris, and R. P. Ried, "Low-Stiffness Silicon Cantilever with Integrated Heaters and Piezoresistive Sensors for High-Density Data Storage," Journal of Microelectromechanical Systems, vol. 7, pp. 69-78, 1998.

T. S. Ravi, R. B. Marcus, and D. Liu, "Oxidation Sharpening Of Silicon Tips," Journal of Vacuum Science & Technology B, vol. 9, pp. 2733-2737, November-December 1991.

W. P. King, T. W. Kenny, K. E. Goodson, G. Cross, M. Despont, U. Durig, H. Rothuizen, G. K. Binnig, and P. Vettiger, "Atomic force microscope cantilevers for combined thermomechanical data writing and reading," Applied Physics Letters, vol. 78, pp. 1300-1302, Feb. 26 2001.

J. Lee, T. L. Wright, T. W. Beecham, S. Graham, and W. P. King, "Electrical, Thermal, and Mechanical Characterization of Heated Microcantilevers," Journal of Microelectromechanical Systems, vol. In Press, 2006.

U.S. Pat. No. 6,762,402.

U.S. Pat. No. 7,038,996.

U.S. Patent Application Publication No. US2006/0238206.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups, and classes that can be formed using the substituents are disclosed separately. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of compounds or materials are intended to be exemplary, as it is known that one of ordinary skill in the art can name the same compounds or materials differently. One of ordinary skill in the art will appreciate that methods, device elements, starting materials, and synthetic and fabrication methods other than those specifically exemplified can be employed in the practice of the invention without resort to undue experimentation. All art-known functional equivalents, of any such methods, device elements, starting materials, and synthetic and fabrication methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

I claim:

1. A device for measuring or controlling temperature-dependent electrical properties of a surface comprising:
    a. a cantilever having a fixed end and a free end, said cantilever comprising single crystal silicon;
    b. a heater-thermometer positioned near said free end of said cantilever, wherein said heater-thermometer comprises a thermistor comprising doped single crystal silicon;
    c. a conductive tip electrode for measuring or controlling a voltage between said conductive tip electrode and said surface or for flowing a current between said conductive tip electrode and said surface, said conductive tip electrode positioned near said free end of said cantilever, wherein said conductive tip electrode is electrically isolated from said heater-thermometer;

d. a layer of insulating material positioned to provide electrical isolation between said conductive tip electrode and said heater-thermometer; and e. one or more single crystal silicon electrodes electrically connected to said heater-thermometer or said conductive tip electrode, wherein said one or more single crystal silicon electrodes comprise one or more legs of said cantilever.

2. The device of claim 1 wherein said one or more single crystal silicon electrodes comprise a first doped single crystal silicon electrode electrically connected to said heater-thermometer, a second doped single crystal silicon electrode electrically connected to said heater-thermometer, and a third electrode electrically connected to said conductive tip electrode.

3. The device of claim 2 wherein said third electrode comprises doped single crystal silicon or metal coated single crystal silicon.

4. The device of claim 1 wherein said one or more single crystal silicon electrodes comprise a first doped single crystal silicon electrode electrically connected to said heater-thermometer, and a second electrode electrically connected to both said heater-thermometer and said conductive tip electrode.

5. The device of claim 4 wherein said second electrode comprises doped single crystal silicon or metal coated single crystal silicon.

6. The device of claim 1 wherein said one or more electrodes deliver electrical current to said heater-thermometer for effecting a temperature change in said heater-thermometer.

7. The device of claim 1 wherein said one or more electrodes provide a voltage or current to or from said conductive tip electrode.

8. The device of claim 1 wherein said one or more electrodes comprise a material that can withstand a temperature up to 1250° C.

9. The device of claim 1 wherein said one or more electrodes comprise a metal.

10. The device of claim 9 wherein said metal is selected from the group consisting of tungsten, gold, aluminum, platinum, and nickel.

11. The device of claim 1 wherein said heater-thermometer comprises a material that can withstand a temperature up to 1250° C.

12. The device of claim 1 wherein said conductive tip electrode comprises a metal or a doped semiconductor.

13. The device of claim 12 wherein said metal is selected from the group consisting of tungsten, gold, aluminum, platinum, and nickel.

14. The device of claim 12 wherein said doped semiconductor is selected from the group consisting of doped diamond and doped silicon.

15. The device of claim 1 wherein the layer of insulating material is selected from the group consisting of undoped silicon, silicon oxide, silicon nitride, diamond, and polymer.

16. The device of claim 1 wherein said electrical isolation also provides thermal insulation between the conductive tip electrode and said heater-thermometer.

17. The device of claim 1 wherein said electrical isolation allows for thermal communication between the conductive tip electrode and said heater-thermometer.

18. The device of claim 1 wherein said heater-thermometer is spatially offset from said conductive tip electrode.

19. The device of claim 1 wherein said heater-thermometer is located on top of said conductive tip electrode.

20. The device of claim 1, wherein said conductive tip electrode comprises a conductive coating over a cantilever tip.

21. A method of sensing an attribute of a surface, a liquid, or a gas, the method comprising:

a. providing said surface, said liquid, or said gas;

b. providing a device having a conductive tip electrode in thermal or electrical communication with said surface, said liquid, or said gas, said device comprising:

i. a cantilever having a fixed end and a free end, said cantilever comprising single crystal silicon;

ii. a heater-thermometer positioned near said free end of said cantilever, wherein said heater-thermometer comprises a thermistor comprising doped single crystal silicon;

iii. said conductive tip electrode for measuring or controlling a voltage between said conductive tip electrode and said surface, said liquid, or said gas or for flowing a current between said conductive tip electrode and said surface, said liquid, or said gas, said conductive tip electrode positioned near said free end of said cantilever, wherein said conductive tip electrode is electrically isolated from said heater-thermometer;

iv. a layer of insulating material positioned to provide electrical isolation between said conductive tip electrode and said heater-thermometer; and v. one or more single crystal silicon electrodes electrically connected to said heater-thermometer or said conductive tip electrode, wherein said one or more single crystal silicon electrodes comprise one or more legs of said cantilever; and c. measuring an electrical property of said heater-thermometer, said conductive tip electrode, or both, thereby sensing said attribute of said surface, said liquid, or said gas.

22. The method of claim 21 wherein said attribute of said surface, said liquid, or said gas is selected from the group consisting of the temperature of said surface, said liquid, or said gas; the electrical potential of said surface, said liquid, or said gas; and both the temperature and electrical potential of said surface, said liquid or said gas.

23. The method of claim 21 wherein said temperature of said surface, said liquid, or said gas is sensed by measuring a resistance across said heater-thermometer.

24. The method of claim 21 wherein said electrical potential of said surface, said liquid, or said gas is sensed by measuring a voltage of said conductive tip electrode.

25. The method of claim 21 wherein in step c said electrical property is selected from the group consisting of the resistance across said heater-thermometer; and the electrical potential of said conductive tip electrode.

26. A method of controlling an attribute of a surface, a liquid, or a gas, the method comprising:

a. providing said surface, said liquid, or said gas;

b. providing a device having a conductive tip electrode in thermal or electrical communication with said surface, said liquid, or said gas, said device comprising:

i. a cantilever having a fixed end and a free end, said cantilever comprising single crystal silicon;

ii. a heater-thermometer positioned near said free end of said cantilever, wherein said heater-thermometer comprises a thermistor comprising doped single crystal silicon;

iii. said conductive tip electrode for controlling or measuring a voltage between said conductive tip electrode and said surface, said liquid, or said gas or for flowing a current between said conductive tip electrode and said surface, said liquid, or said gas, said conductive tip electrode positioned near said free end of said cantilever, wherein said conductive tip electrode is electrically isolated from said heater-thermometer; and iv. a layer of insulating material positioned to provide electrical isolation between said conductive tip electrode and said heater-thermometer; and v. one or more single crystal silicon electrodes electrically connected to said heater-thermometer or said conductive tip electrode, wherein said one or more single crystal silicon electrodes comprise one or more legs of said cantilever; and c. providing a voltage or current to said heater-thermometer, said conductive tip electrode, or both.

27. The method of claim 26 wherein said attribute of said surface, said liquid, or said gas is selected from the group consisting of the temperature of said surface, said liquid, or said gas; the electrical potential of said surface, said liquid, or said gas; and both the temperature and electrical potential of said surface, said liquid, or said gas.

28. The method of claim 26 wherein said temperature of said surface, said liquid, or said gas is controlled by providing a current to said heater-thermometer.

29. The method of claim 26 wherein said electrical potential of said surface, said liquid, or said gas is controlled by providing a voltage to said conductive tip electrode.

30. A method of manipulating a surface, said method comprising:

a. providing a surface;

b. providing a device having a conductive tip electrode in thermal or electrical communication with said surface, said device comprising:

i. a cantilever having a fixed end and a free end, said cantilever comprising single crystal silicon;

ii. a heater-thermometer positioned near said free end of said cantilever, wherein said heater-thermometer comprises a thermistor comprising doped single crystal silicon;

iii. said conductive tip electrode for measuring or controlling a voltage between said conductive tip electrode and said surface or for flowing a current between said conductive tip electrode and said surface, said conductive tip electrode positioned near said free end of said cantilever, wherein said conductive tip electrode is electrically isolated from said heater-thermometer; and iv. a layer of insulating material positioned to provide electrical isolation between said conductive tip electrode and said heater-thermometer; and v. one or more single crystal silicon electrodes electrically connected to said heater-thermometer or said conductive tip electrode, wherein said one or more single crystal silicon electrodes comprise one or more legs of said cantilever; and c. providing a voltage or current to said heater-thermometer, said conductive tip electrode, or both.

31. The method of claim 30 wherein said manipulation of said surface is selected from the group consisting of changing the physical state of said surface; heating said surface; cooling said surface; changing or inducing a magnetic orientation of said surface; changing the level of oxidation of said surface; creating a glass transition in said surface; injecting electrons into said surface; and depositing material onto said surface.

32. The method of claim 30 further comprising d. allowing said surface to have thermal interaction with said heater-thermometer; and e. providing a second voltage or current to said heater-thermometer, said conductive tip electrode, or both.

33. The method of claim 32 wherein the current or voltage provided in step c results in a temperature change of said heater-thermometer and said surface and wherein said second voltage or current provided in step e effects a manipulation of said surface selected from the group consisting of changing the physical state of said surface; heating said surface; cooling said surface; changing or inducing a magnetic orientation of said surface; changing the level of oxidation of said surface; creating a glass transition in said surface; injecting electrons into said surface; and depositing material onto said surface.

34. A method of manipulating a surface, said method comprising:

a. providing a surface;

b. providing a device having a conductive tip electrode in thermal or electrical communication with a gas or a liquid, said gas or said liquid positioned between said surface and said conductive tip electrode, said device comprising:

i. a cantilever having a fixed end and a free end, said cantilever comprising single crystal silicon;

ii. a heater-thermometer positioned near said free end of said cantilever, wherein said heater-thermometer comprises a thermistor comprising doped single crystal silicon;

iii. said conductive tip electrode for measuring or controlling a voltage between said conductive tip electrode and said surface, said liquid, or said gas or for flowing a current between said conductive tip electrode and said surface, said liquid, or said gas, said conductive tip electrode positioned near said free end of said cantilever, wherein said conductive tip electrode is electrically isolated from said heater-thermometer; and iv. a layer of insulating material positioned to provide electrical isolation between said conductive tip electrode and said heater-thermometer; and v. one or more single crystal silicon electrodes electrically connected to said heater-thermometer or said conductive tip electrode, wherein said one or more single crystal silicon electrodes comprise one or more legs of said cantilever; and c. providing a voltage or current to said heater-thermometer, said conductive tip electrode, or both.

35. The method of claim 34 wherein the current or voltage provided in step c results in a temperature change of said heater-thermometer and said gas or said liquid, or a discharge from said conductive tip electrode to said gas or said liquid.

36. The method of claim 35 wherein said temperature change of said liquid or said gas or said discharge from said conductive tip electrode to said liquid or said gas results in a chemical or physical reaction of said surface with said gas or said liquid.

37. A device for measuring or controlling temperature-dependent electrical properties of a surface, a liquid, or a gas comprising:

a. a cantilever having a fixed end and a free end, said cantilever comprising single crystal silicon;

b. a heater-thermometer positioned between 0 and 200 µm of said free end of said cantilever, wherein said heater-thermometer comprises a thermistor comprising doped single crystal silicon;

c. a conductive tip electrode for measuring or controlling a voltage between said conductive tip electrode and said surface, said liquid, or said gas or for flowing a current between said conductive tip electrode and said surface, said liquid, or said gas, said conductive tip electrode positioned between 0 and 200 μm of said free end of said cantilever, wherein said conductive tip electrode is electrically isolated from said heater-thermometer;
d. a first doped single crystal silicon electrode electrically connected to said heater-thermometer;
e. a second doped single crystal silicon electrode electrically connected to said heater-thermometer;
f. a third electrode electrically connected to said conductive tip electrode; and
g. a layer of insulating material positioned to provide electrical isolation between said conductive tip electrode and said heater-thermometer;
wherein one or more of said first doped single crystal silicon electrode, said second doped single crystal silicon electrode and said third electrode comprise one or more legs of said cantilever.

38. A device for measuring or controlling temperature-dependent electrical properties of a surface, a liquid, or a gas comprising:

a. a cantilever having a fixed end and a free end, said cantilever comprising single crystal silicon;
b. a heater-thermometer positioned between 0 and 200 μm of said free end of said cantilever, wherein said heater-thermometer comprises a thermistor comprising doped single crystal silicon;
c. a conductive tip electrode for measuring or controlling a voltage between said conductive tip electrode and said surface, said liquid, or said gas or for flowing a current between said conductive tip electrode and said surface, said liquid, or said gas, said conductive tip electrode positioned between 0 and 200 μm of said free end of said cantilever, wherein said conductive tip electrode is electrically isolated from said heater-thermometer;
d. a first doped single crystal silicon electrode electrically connected to said heater-thermometer;
e. a second electrode electrically connected to said heater-thermometer and said conductive tip electrode;
g. a layer of insulating material positioned to provide electrical isolation between said conductive tip electrode and said heater-thermometer;
wherein one or both of said first doped single crystal silicon electrode and said second electrode comprise one or more legs of said cantilever.

* * * * *